US008233087B2

(12) United States Patent
Srinivasan et al.

(10) Patent No.: US 8,233,087 B2
(45) Date of Patent: Jul. 31, 2012

(54) SYSTEMS AND METHODS FOR DEINTERLACING HIGH-DEFINITION AND STANDARD-DEFINITION VIDEO

(75) Inventors: Sujith Srinivasan, Bangalore (IN); Sanjay Garg, Bangalore (IN); Nikhil Balram, Mountain View, CA (US); Biswas Mainak, Santa Cruz, CA (US)

(73) Assignee: Marvell International Ltd., Hamilton (BM)

( * ) Notice: Subject to any disclaimer, the term of this patent is extended or adjusted under 35 U.S.C. 154(b) by 1232 days.

(21) Appl. No.: 11/932,686

(22) Filed: Oct. 31, 2007

(65) Prior Publication Data

US 2008/0106642 A1 May 8, 2008

Related U.S. Application Data

(60) Provisional application No. 60/864,881, filed on Nov. 8, 2006.

(51) Int. Cl.
*H04N 11/20* (2006.01)
*H04N 5/222* (2006.01)

(52) U.S. Cl. ........ 348/452; 348/451; 348/446; 348/448; 348/333.12

(58) Field of Classification Search .................. 348/452, 348/451, 446, 448, 333.12
See application file for complete search history.

(56) References Cited

U.S. PATENT DOCUMENTS

| | | | |
|---|---|---|---|
| 5,347,314 A | 9/1994 | Faroudja et al. | |
| 5,521,644 A * | 5/1996 | Sezan et al. | 348/452 |
| 5,936,676 A * | 8/1999 | Ledinh et al. | 348/452 |
| 7,075,581 B1 * | 7/2006 | Ozgen et al. | 348/448 |
| 7,349,029 B1 * | 3/2008 | Chou | 348/448 |
| 7,405,766 B1 * | 7/2008 | Chou et al. | 348/448 |
| 7,990,471 B1 * | 8/2011 | Otobe et al. | 348/448 |
| 2003/0156301 A1 | 8/2003 | Kempf et al. | |
| 2005/0073607 A1 | 4/2005 | Ji et al. | |
| 2006/0077305 A1 | 4/2006 | Wyman | |
| 2006/0222266 A1 * | 10/2006 | Lauze et al. | 382/299 |
| 2007/0052846 A1 * | 3/2007 | Adams | 348/452 |
| 2008/0062307 A1 * | 3/2008 | Zhai et al. | 348/448 |
| 2008/0062308 A1 * | 3/2008 | Zhai et al. | 348/448 |

FOREIGN PATENT DOCUMENTS

| | | |
|---|---|---|
| EP | 1 198 137 A1 | 4/2002 |
| EP | 1 387 577 A2 | 2/2004 |
| EP | 1 515 543 A2 | 3/2005 |
| EP | 1 592 250 A1 | 11/2005 |
| WO | WO 02/056597 | 7/2002 |

OTHER PUBLICATIONS

International Search Report dated Jun. 27, 2008, Application No. PCT/US2007/023450.

* cited by examiner

*Primary Examiner* — Hoang-Vu A Nguyen-Ba

(57) ABSTRACT

A motion adaptive video deinterlacer may process fields of video derived from frames of video. The deinterlacer may use multiple pixel motion engines to provide motion information about the pixels within each field. The output of the motion engines may be used to deinterlace the fields of video based on the detail within a field of video. The deinterlacer may use motion recursion and motion recirculation to provide temporal motion expansion for the pixels within each field. In addition, the deinterlacer may detect various cadences for various regions within the frames of video. The cadences may be detected using a calculated threshold, or without using a calculated threshold.

75 Claims, 22 Drawing Sheets

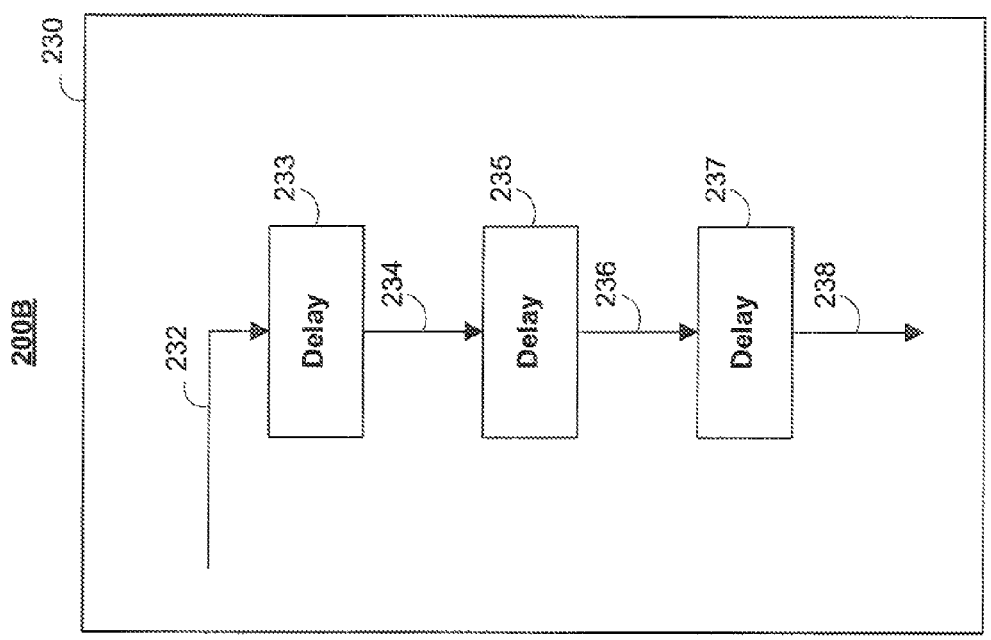

SYSTEMS AND METHODS FOR DEINTERLACING HIGH-DEFINITION AND STANDARD-DEFINITION VIDEO

CROSS REFERENCE TO RELATED APPLICATIONS

This claims the benefit of copending, commonly-assigned U.S. Provisional Patent Application No. 60/864,881 filed Nov. 8, 2006, which is hereby incorporated by reference herein in its entirety.

BACKGROUND OF THE INVENTION

This invention generally relates to systems and methods for deinterlacing high-definition and standard definition video using adaptive techniques for spatial and temporal motion.

Video is often interlaced in order to improve picture quality and decrease the bandwidth required for transmission. Interlaced video formats provide one half of the lines in an image for any given frame—the odd-numbered horizontal lines of the frame may be displayed at one instant, while the even-numbered lines of the frame may be displayed the next. Each set of lines can be referred to as a field. In order to display the video in progressive, or noninterlaced, format, interlaced video must be deinterlaced. Deinterlacing requires the derivation of the missing set of lines for any given field.

One deinterlacing technique known as film-mode deinterlacing takes advantage of film content's 3-2 cadence to create 60 perfect full frames of video per second. A cadence refers to a pattern of successive fields. Another deinterlacing technique known as video-mode deinterlacing employs single-mode interpolation, weaving, vertical interpolation, motion adaptive deinterlacing, or a combination of such techniques to process video content to create 60 full frames of video per second. Video-mode deinterlacing often results in undesirable artifacts in the video. These artifacts include line flicker, Moire, or aliasing. Such artifacts may be marginally noticeable on moderate sized televisions, such as televisions that are 42-inches in size or smaller, that display video at lower resolution formats such as 480i or 720i. However, displaying video on televisions that are 42 inches or larger in size and capable of displaying resolutions of 1920 by 1080 pixels can cause these artifacts to be more visible.

Typical deinterlacing schemes for high-definition television deinterlace mixed-mode content, or film content that includes text content, with video-mode deinterlacing rather than film-mode deinterlacing. This use of deinterlacing may cause the text to appear blurred, or feathered, and may introduce artifacts such as line flicker and Moire. Further, known deinterlacing schemes for high-definition television provide single engines for processing motion. This deficiency may cause portions of video to be deinterlaced using suboptimal techniques.

In view of the foregoing, there is a continuing interest in providing a robust deinterlacing scheme that provides high-quality video on displays of all sizes and resolutions.

SUMMARY OF THE INVENTION

A motion adaptive video deinterlacer may receive a sequence of video frames. Each video frame may include multiple fields. One field may include every even horizontal line of video in a frame, while another field may include every odd horizontal line of video in a frame. The motion adaptive video deinterlacer may include temporal and spatial motion tap circuitry that can receive the frames and create several delayed versions of the frames and their corresponding fields. A tap may be generally defined as an available connection to a portion of circuitry. For example, the spatial motion tap circuitry may allow access to a stored current frame, previous frame, and a next, or future, frame.

The motion adaptive video deinterlacer may also include motion handling circuitry. The motion handling circuitry may produce motion information about each pixel in the fields of the video frames processed by the deinterlacer. The motion handling circuitry may use pixel motion engines to produce this information. These pixel motion engines may include engines that perform spatial filtering and compute various differences between groups of pixels between the fields. The motion engines may produce their output in parallel. One of the outputs from the motion engines may be selected based on the amount of detail surrounding a particular pixel in a field, which may be a pixel that is missing in the field—e.g. a pixel in a line that is not included in the field.

The motion adaptive video deinterlacer may include recursive motion circuitry. The recursive motion circuitry may use pixel motion engines to provide temporal motion expansion of the fields. Temporal motion expansion refers to incorporating a portion of a field into a neighboring temporal field—e.g. a previous field or a next field. The recursive motion circuitry may provide this temporal motion expansion by applying a weighted average function to the pixel motion information and delayed versions of the pixel motion information.

The motion adaptive video deinterlacer may include cadence handling circuitry. The cadence handling circuitry may detect a cadence in the video being processed by the deinterlacer. The video processed by the deinterlacer may be split into regions. The cadence detection circuitry may detect cadences for each of these regions. Once a cadence has been detected, the video for that particular region may be processed according to a particular processing mode.

The cadence detection circuitry may use film cadence state machine circuitry to detect the cadences. The film cadence state machine circuitry may detect patterns in a set of global flags within the deinterlacer. The global flags may be compared against pattern input.

In some embodiments, the cadence detection circuitry may determine when to enter and exit a particular cadence mode of processing based on a calculated noise threshold. The noise threshold may be calculated based on differences between groups of pixels between the fields.

In other embodiments, the cadence detection circuitry may enter and exit a cadence mode of processing by tracking the position of a minimum difference between groups of pixels between the fields. The position of the minimum difference may be tracked as the frames of video are processed by the deinterlacer by a state machine.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 2B shows a more detailed view of the temporal and spatial tap circuitry in accordance with one embodiment of the invention;

DETAILED DESCRIPTION

Figure 1A:
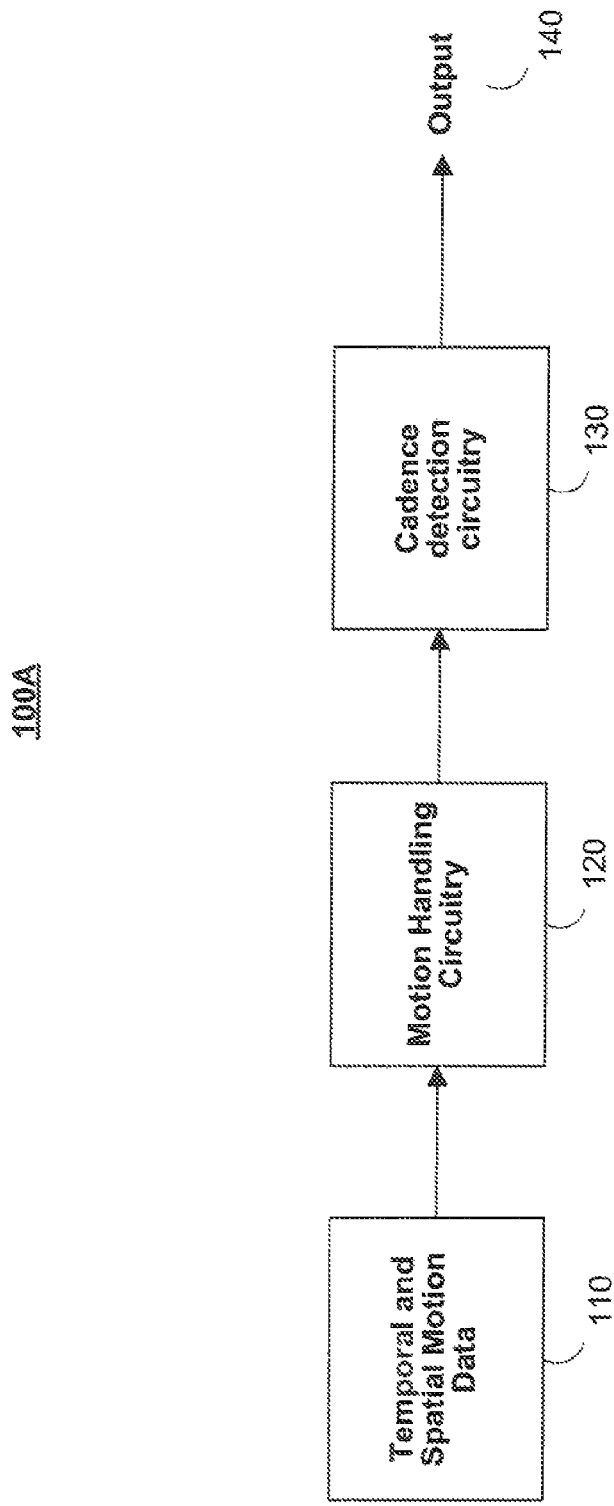
FIG. 1A shows an illustrative top-level block diagram of deinterlacer circuitry in accordance with one embodiment of the invention.

FIG. 1A shows an illustrative top-level diagram of deinterlacer circuitry 100A in accordance with one embodiment of the invention. Deinterlacer circuitry 100A can receive temporal and spatial motion data 110 as input. Temporal and spatial motion data 110 may include interlaced frames of video from standard definition television signals, high-definition television signals, or a combination of both. The interlaced frames of video may include several fields. For example, a single frame of video may include two fields—one field consisting of all of the even horizontal lines of video in the frame, and a second field consisting of all of the odd horizontal lines of video in the frame. These two fields may be referred to as having opposite polarity. Temporal and spatial motion data 110 may be passed to motion handling circuitry 120 for further processing.

Motion handling circuitry 120 may process all deinterlacing tasks associated with spatial motion and temporal motion. Spatial motion may be defined as motion relative to groups of pixels in the same frame. Temporal motion may be defined as motion relative to pixels from one frame to the next. Motion handling circuitry 120 may provide motion adaptive processing engines. The motion adaptive processing engines may compute motion information such as motion vectors, interpolated motion pixels, motion magnitude, or any suitable motion information. The motion adaptive processing engines may include per pixel motion engines. Per pixel motion engines may calculate spatial and temporal motion information for a particular pixel in a field. The per pixel motion engines may estimate motion values for a pixel missing in an intermediate field between a previous field and a successive field.

The motion adaptive processing engines may be tailored to the chromatic and achromatic components of the video signal—i.e. luma and chroma. Luma motion information may be calculated separately from chroma motion information, such as with different circuitry that may execute different processing techniques.

Motion handling circuitry may also provide motion expansion engines. The motion expansion engines may calculate motion information for a particular pixel based on the motion information of neighboring pixels in the same field or in a neighboring temporal field—e.g. a previous field or a next field.

The motion expansion engines may include temporal motion expansion engines. The temporal motion expansion engines may use motion recursion to temporally expand motion information. Temporal motion expansion refers to incorporating a portion of a field into a neighboring temporal field—e.g. a previous field or a next field. In addition, the motion expansion engines may include spatial motion expansion engines. The spatial motion expansion engines may use information from pixels surrounding a particular pixel of interest to calculate motion information for that pixel.

In one embodiment, the motion adaptive processing engines may include two per pixel motion engines. The two per pixel motion adaptive engines may work in parallel to compute motion information. A first per pixel motion engine may estimate pixel motion using spatial filtering, while a second per pixel motion engine may compute motion by spatial motion expansion information. In certain embodiments, the output of one of the per pixel motion adaptive engines may be selected based on the detail of the pixels surrounding the pixel for which the motion information is being calculated. For example, the output of the second per pixel motion engine may be selected when there is little detail, or variance in pixel values surrounding the pixel for which motion information is being calculated. This restriction limits the use of spatial motion expansion and its associated drawbacks while using it only where it is really needed—e.g. uniform areas of images. Drawbacks of using spatial motion expansion may include softening moving images and feathering text. Motion handling circuitry 120 may pass motion information to cadence detection circuitry 130.

Cadence detection circuitry 130 may process all deinterlacing tasks associated with the detection of video and film cadences. A cadence refers to a pattern of successive fields.

One common cadence is known as a 3-2 film cadence. In a 3-2 film cadence, 24 frames of film are represented as 60 interlaced fields. This is accomplished by representing each frame as two separate fields, a field of odd numbered horizontal lines of video and a field of even numbered lines of video, to create 48 interlaced fields per second. The remaining 12 frames are created by selectively adding extra fields every other frame. For example, consider four frames of film: A, B, C, and D. Frame A is split into one field of odd numbered horizontal lines of video followed by one field of even numbered lines of video. However, frame B is split into one field of odd numbered lines, followed by one field of even lines, followed by another field of odd numbered lines. This cycle repeats for frames C and D.

Cadence detection circuitry 130 may detect various film and video cadences using temporal and spatial motion data and state machine circuitry. The state machine circuitry may detect patterns in the temporal and spatial motion data, in the motion information calculated by motion handling circuitry 120, or in a combination of both. There may be a separate state machine for each film cadence. The film cadences detected by cadence detection circuitry 130 may include 3-2, 2-2, 2-2-2-4, 2-3-3-2, 3-2-3-2-2, 5-5, 6-4, 8-7, or any suitable film cadence.

In certain embodiments, motion handling circuitry 120 and cadence detection circuitry 130 may divide the video into regions. Each region may then be processed by separate motion engines and/or cadence detection logic. This technique may aid in processing mixed mode video, such as a film that contains moving images in one portion of the frame and subtitle text in another portion of the frame. In one embodiment, motion handling circuitry 120 and cadence detection circuitry 130 may split the frame into two separate regions—e.g. the full frame and a top potion of the frame. The top portion of the frame may be defined as the full frame excluding a programmable number of horizontal lines of video at the bottom of the frame. Parallel motion and cadence detection logic may be applied to the full frame and the top portion of the frame. The top portion of the frame may be processed according to one set of cadence detection circuitry 130 while the full frame may be processed according to another set of cadence detection circuitry 130—effectively processing the bottom portion of the frame with separate logic from the top portion of the frame. For example, if the top portion of the frame is detected as film, while the full frame is not, then only the top portion of the frame will be processed with specialized cadence detection circuitry 130. This technique provides advantages over performing parallel cadence detection on the top portion of the frame and the bottom portion of the frame, as it is often difficult to detect the cadence on the bottom portion of the frame as it contains very few pixels.

Cadence detection circuitry 130 may also include automatic noise calibration circuitry. The automatic noise calibration circuitry may set noise thresholds. The noise thresholds may be used by cadence detection circuitry 130 in combination with the motion information from motion handling circuitry 120 to determine whether there is noise in the video. This determination may be helpful in detecting incorrect motion information from motion handling circuitry 120 and preventing noise from being detected as motion information.

Cadence detection circuitry 130 may determine when to enter and exit processing under various cadence modes. This determination may be made by comparing certain characteristics between pixels in two neighboring fields with the same polarity.

Cadence detection circuitry 130 may produce output 140. Output 140 may include fields of deinterlaced video. The fields of deinterlaced video may be of standard-definition or high-definition format, depending on temporal and spatial motion data 110 that was input to the deinterlacer circuitry 100A.

Figure 1B:
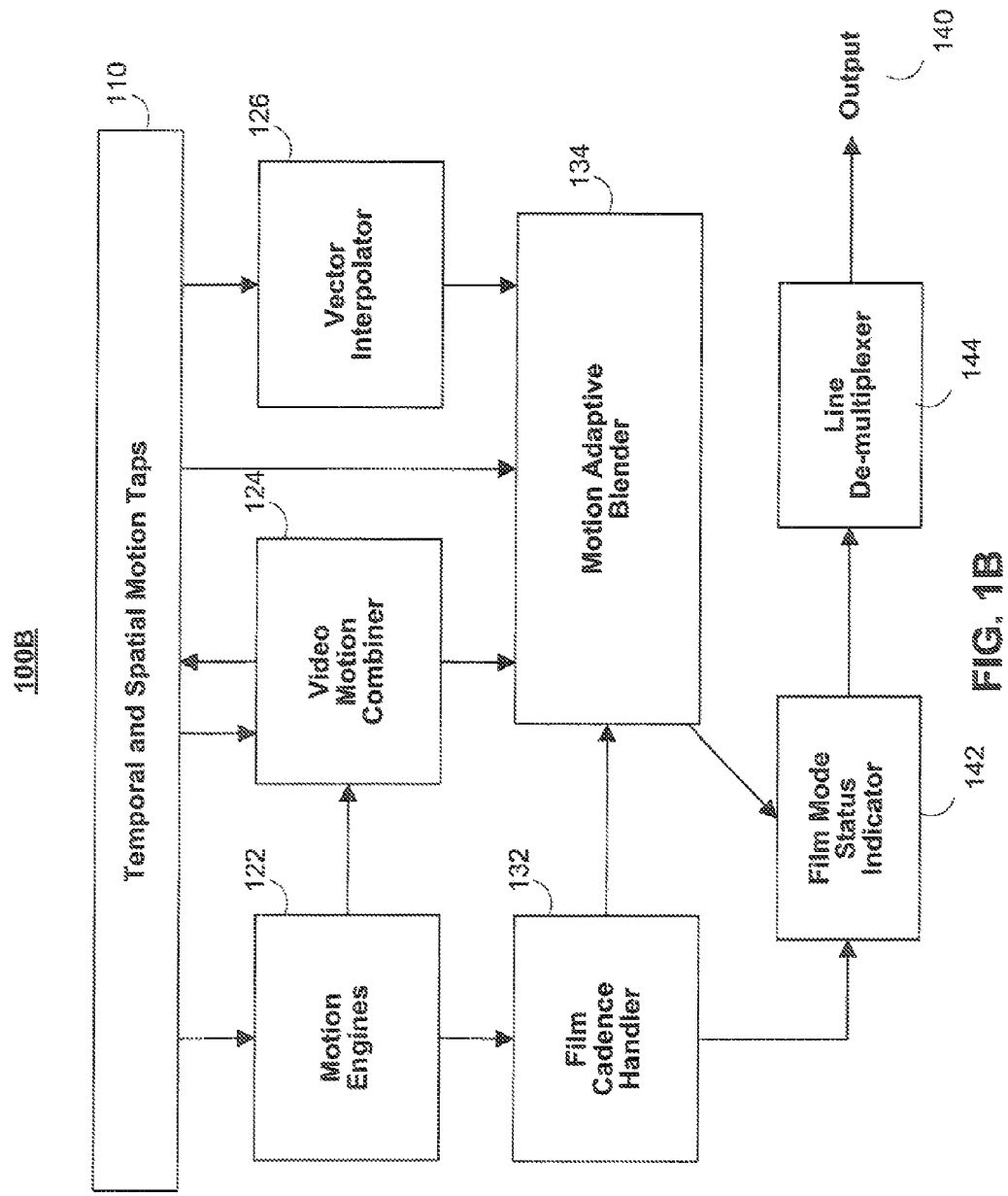
FIG. 1B shows a more detailed top-level block diagram of deinterlacer circuitry in accordance with one embodiment of the invention.

FIG. 1B shows a more detailed illustrative top-level diagram 100B of deinterlacer circuitry 100A in accordance with one embodiment of the invention. Deinterlacer diagram 100B includes temporal and spatial motion taps 110. Temporal and spatial motion taps 110 include buffers of data similar to the data described in temporal and spatial motion data 110 in FIG. 1A. Temporal and spatial motion taps 110 may include separate buffers for luma and chroma field information.

Temporal and spatial motion taps 110 may pass data to motion engines 122. Motion engines 122 may include circuitry for various per pixel motion adaptive processing engines. The motion adaptive processing engines may include motion adaptive processing engines substantially similar to those discussed with respect to motion handling circuitry 120 in FIG. 1A. These engines may compute a variety of per pixel motion measurements. For example, motion engines 122 may compute the mean of the absolute differences, or MAD, between corresponding groups of pixels in successive frames. In addition, motion engines 122 may compute the sum of the absolute differences, or SAD, between corresponding groups of pixels in successive frames. Also, motion engines 122 may compute absolute differences between corresponding groups of pixels and select the maximum absolute difference, or MAX. In addition, motion engines 122 may compute edge adaptive measurements, or EDAP, from groups of pixels in successive frames. These per pixel measurements may be passed on to video motion combiner 124 and film cadence handler 132.

Video motion combiner 124 can take the per pixel measurements from motion engines 122 and use this data to compute luma motion values and chroma motion values. In one embodiment, the luma motion values are selected from one of the motion engines 122 adaptively based on the detail surrounding the pixel for which motion is being calculated. The luma motion values for a particular field may be processed recursively with luma motion values from neighboring fields in order to average the luma motion values. Field motion values may be used in place of the per pixel motion values when it is determined that there is a high level of motion between successive fields. In addition, horizontal motion expansion may be used to calculate final pixel motion. Unlike the luma motion values, the chroma motion values may not be processed recursively.

Temporal and spatial motion taps 110 may also pass information to vector interpolator 126. Vector interpolator 126 may use filtering techniques to perform traditional two dimensional, or spatial, filtering. In addition, vector interpolator 126 may use boundary exclusion windows to eliminate parts of fields that contain missing or garbage pixels.

Film cadence handler 132 can take the per pixel measurements from motion engines 122 and detect the presence of film cadences in the video. In addition, the film cadence handler may generate weave directions for every field based on the their particular location in a cadence. For certain video modes, the weave direction may indicate to the deinterlacer circuitry 100B which successive fields to combine in order to form full frames of video.

As part of detecting film cadences, film cadence handler 132 may set flags to signal when to enter and when to exit particular film processing modes. Modes of processing may include 3-2 cadence film mode, 2-2 cadence film mode, or any suitable film cadence modes. In determining when to enter or exit particular film cadence modes, film cadence handler 132 may calculate the SAD between groups of pixels in successive fields of the same polarity. The SAD value may be stored for a number of groups of successive fields. These multiple SAD values may then be used to determine when entry and exit into particular video processing modes should be made. Once these determinations have been made, film cadence handler 132 may send information about processing mode entry and exit and weave direction to film mode status indicator 142 and motion adaptive blender 134.

Motion adaptive blender 134 may use spatially interpolated motion information from vector interpolator 126, luma and chroma motion information from video motion combiner 124, information about previous and successive fields from temporal and spatial motion taps 110, and information about film cadence mode entry and exit and weave direction from film cadence handler 132, in order to compose fields of deinterlaced video. Motion adaptive blender 134 may use the information from film cadence handler 132 to determine what information from video motion combiner 124, temporal and spatial motion taps 110, and vector interpolator 126 to use in composing the fields of video. For example, if the information from film cadence handler 132 indicates that the deinterlacer should enter film mode, motion adaptive blender 134 may ignore the information from the video motion combiner 124 and vector interpolator 126 and use the information from temporal and spatial motion taps 110 to generate missing lines of video in the current field. Motion adaptive blender 134 may have two separate outputs—one for a field of odd horizontal video lines and one for a field of even horizontal video lines. Motion adaptive blender 134 may send these fields to film mode status indicator 142.

Film mode status indicator 142 may use information about film cadence mode entry and exit from film cadence handler 132 and video field output from motion adaptive blender 134 to generate video field output with an indicator. The indicator may signal what film mode should be used to display the video field output. The indicator may be any suitable data structure or signal. Film mode status indicator 142 may have two separate outputs—one for a field of odd horizontal video lines with an indicator and one for a field of even horizontal video lines with an indicator. Film mode status indicator 142 may send these fields with indicators to line demultiplexer 144.

Line demultiplexer 144 may use the video fields with film mode status indicators to compose frames of deinterlaced video. In certain embodiments, line demultiplexor 144 may combine the video fields based on their respective film mode status indicators to form frames of video. In certain embodiments, line demultiplexer 144 may double the line rate of a particular field based on the field's film mode status indicator to form a frame of video. Line demultiplexer 144 may produce output 140. Output 140 may include full frames of video suitable for display on any display device.

Figure 2A:
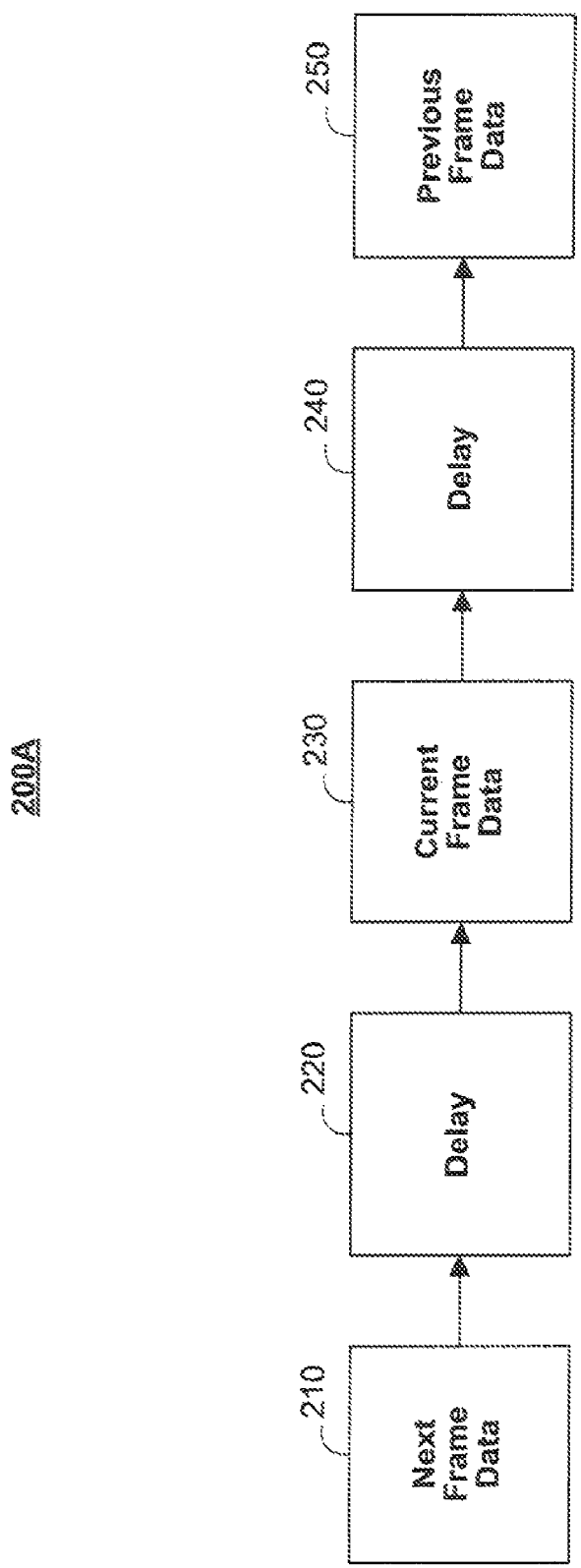
FIG. 2A shows an illustrative top-level block diagram of temporal and spatial tap circuitry in accordance with one embodiment of the invention.

FIG. 2A shows an illustrative top-level block diagram of temporal and spatial tap circuitry 200A in accordance with one embodiment of the invention. Temporal and spatial tap circuitry 200A may be substantially similar to temporal and spatial motion taps 110 depicted in FIG. 1B. The data in temporal and spatial motion tap circuitry 200A may be represented in 8.3 format. Temporal and spatial tap circuitry 200A may include data taps for luma frame motion, chroma frame motion, edge correlation detection information, luma spatial averaging information, chroma spatial averaging information, luma and chroma temporal blending information, or other suitable information about the frames of video to be processed.

Temporal and spatial tap circuitry 200A may include next frame data 210. Next frame data 210 may include the luma and chroma information for a successive frame of video. Current frame data 230 may be next frame data 210 delayed by first delay circuitry 220. Current frame data 230 may include the luma and chroma information for the frame of video that is currently being processed by the deinterlacer. Previous frame data 250 may be current frame data 230 delayed by second delay circuitry 240. Previous frame data 250 may include the luma and chroma information for a previous frame of video. First delay circuitry 220 and second delay circuitry 240 may include latches, flip-flops, or any suitable delay circuitry. The next frame data 210, current frame data 230, and previous frame data 250 may be stored by any suitable memory circuitry;

FIG. 2B shows a more detailed view 200B of a portion of temporal and spatial tap circuitry 200A. Current frame data 230 may include first current tap delay element 233, second current tap delay element 235, and third current tap delay element 237. Each of these delay elements may be similar to delay circuitry 220 and 240 shown in FIG. 2A. In addition current frame data 230 may include topmost pixel tap 238, second topmost pixel tap 236, third topmost pixel tap 234, and bottom most pixel tap 232. Each of these pixel taps may consist of a pixel in a different row of a field of video. For example, topmost pixel tap 234 may include a pixel in the first row of a particular field, second topmost pixel tap 236 may include a pixel in the third row of the same field, third topmost pixel tap 234 may include a pixel in the fifth row of the same field, and bottom most pixel tap 232 may consist of the seventh row of the same field. Each of the pixel taps may be delayed by second delay circuitry 240 to create previous frame data 250.

Figure 3:
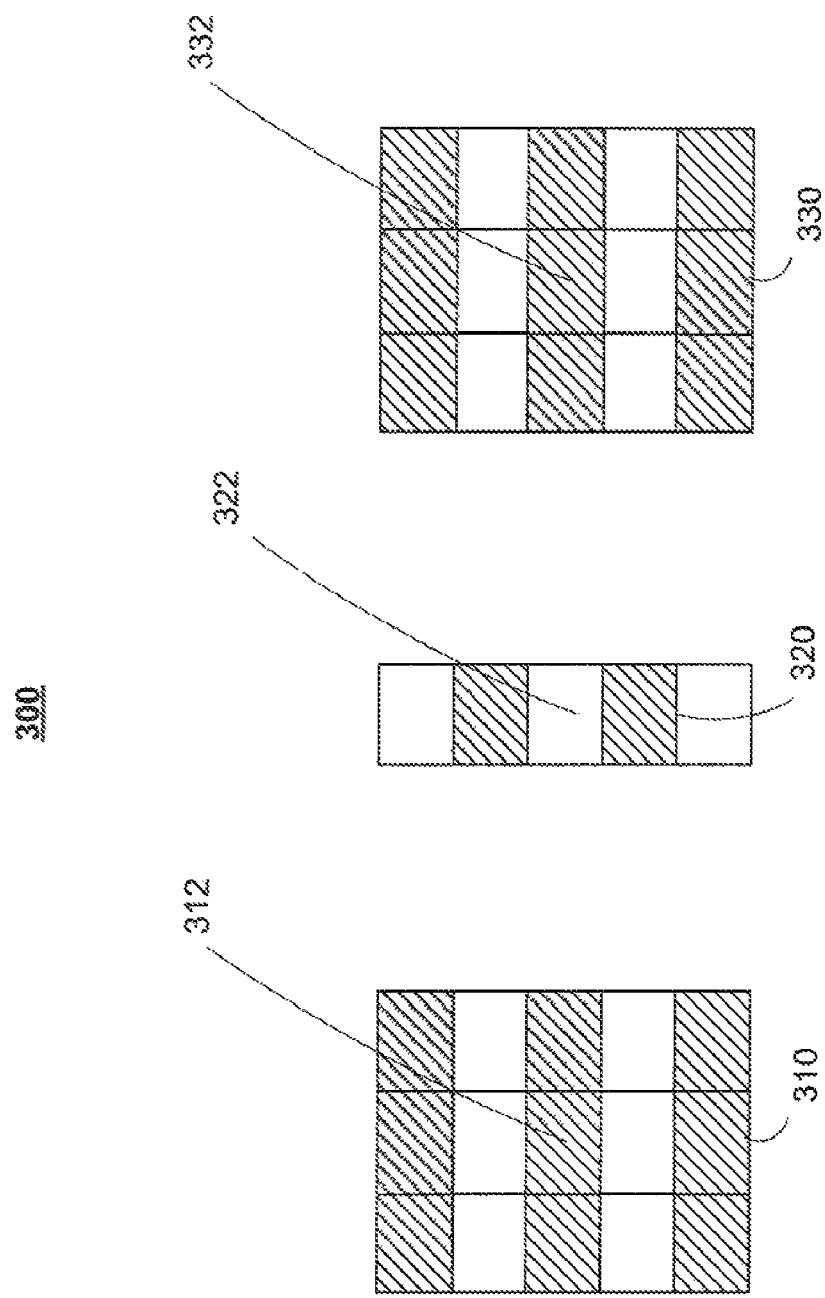
FIG. 3 shows an illustrative setup for computing various types of frame motion in accordance with one embodiment of the invention.

FIG. 3 shows an illustrative setup 300 for computing various types of frame motion. These computations may be performed in the motion engines 122 of the deinterlacer depicted in FIG. 1B. Setup 300 may contain next field pixels 310, previous field pixels 330, and current field pixels 320. The etched pixels may represent pixels on an even horizontal line of video, and the non-etched pixels may represent pixels on an odd horizontal line of video. Next field pixels 310 and previous field pixels 330 may be aligned to missing pixel 322 in current field pixels 320. For example, center pixel 312 of next field pixels 310 and center pixel 332 of previous field pixels 330 may be aligned to missing pixel 322 in current field pixels 320.

Setup 300 may be used to calculate luma frame motion for missing pixel 322 using the mean of the absolute differences between the luma values of previous field pixels 330 and next field pixels 310. This motion engine may be used when there are high levels of noise in the video, as this technique is less sensitive to noise error. The absolute differences may be calculated between the luma values of corresponding previous field pixels 330 and next field pixels 310—e.g. the absolute differences between pixels that are similarly positioned in the block of previous field pixels 330 and next field pixels 310. The corresponding pixels may be limited to the set of pixels in lines of similar polarity—e.g. even lines and odd lines of pixels. The mean may be calculated from the set of absolute differences that are calculated between the blocks of pixels. In certain embodiments, setup 300 may be similarly used to calculate chroma frame motion for missing pixel 322 using the mean of absolute differences between the chroma values of previous field pixels 330 and next field pixels 310.

In certain embodiments, setup 300 may be used to calculate luma frame motion for missing pixel 322 using the maximum of absolute differences between the values of previous field pixels 330 and next field pixels 310. This motion engine may be used when there is less noise in the video and spatial motion expansion is needed. The absolute differences may be calculated between similarly positioned pixels in lines of the same polarity as disclosed above. In certain embodiments, setup 300 may be similarly used to calculate chroma frame motion for missing pixel 322 using the maximum of absolute differences between the chroma values of previous field pixels 330 and next field pixels 310.

The size of next field pixels 310 and previous field pixels 330 may be different than the 3×3 kernel depicted in setup 300. For example, the size of next field pixels may be 1×1, 5×3, 7×3, or any suitable kernel size to compute motion information about missing pixel 322.

In certain embodiments, the absolute difference calculations may be scaled. The scaling may reduce the representation of the absolute differences to four bit values. The scaling may be based on two thresholds—a low threshold and a high threshold. All calculated values below the low threshold may be assigned the lowest four bit value, i.e. 0, and all calculated values higher than the high threshold may be assigned the highest four bit value, i.e. 15. All calculated values between the low threshold and the high threshold may be distributed between the 14 remaining four bit values.

Figure 4:
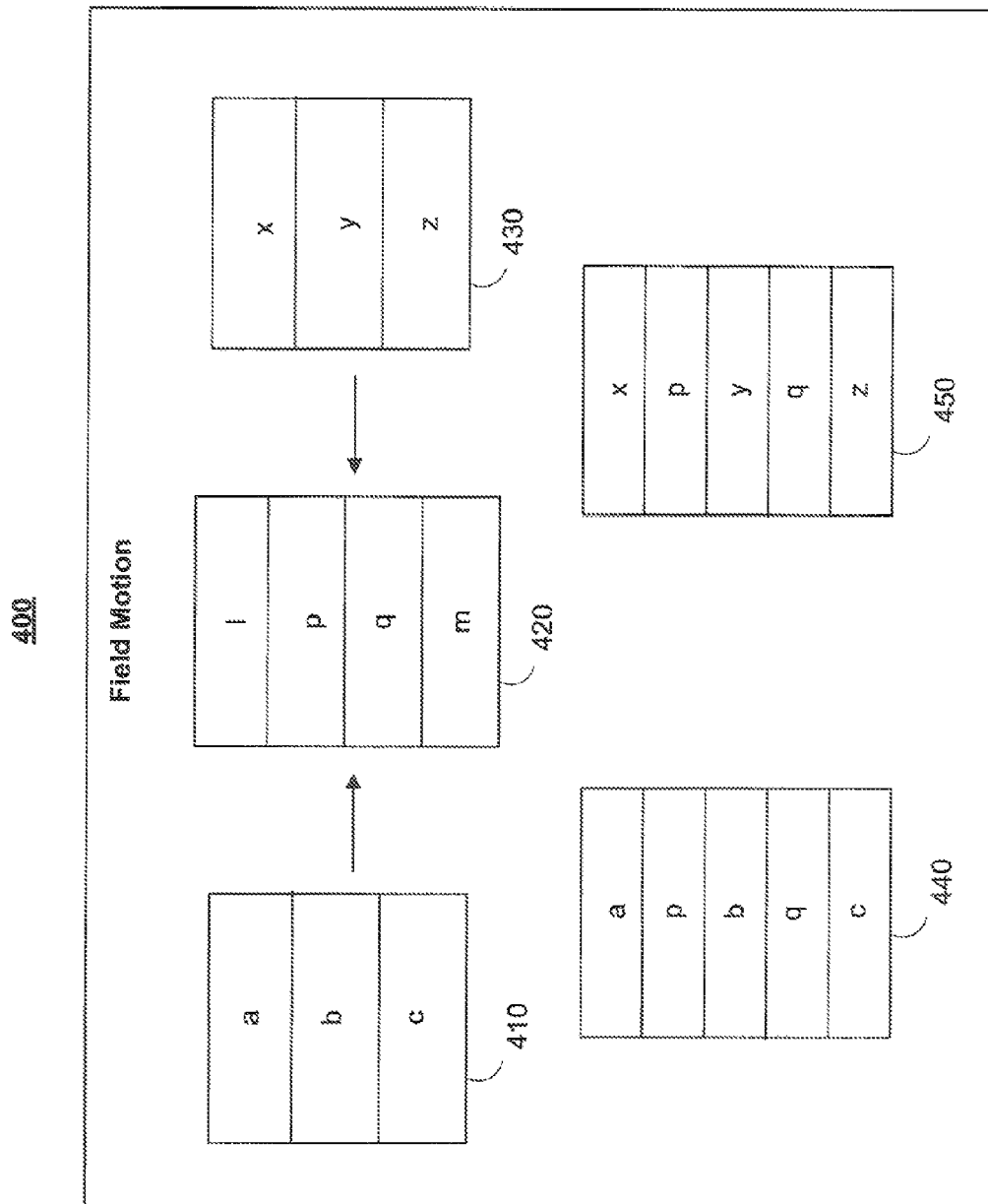
FIG. 4 shows an illustrative setup for computing various types of field motion in accordance with one embodiment of the invention.

FIG. 4 shows an illustrative setup 400 for computing various types of field motion. These computations may be performed in the motion engines 122 of the deinterlacer depicted in FIG. 1B. Setup 400 may contain previous pixels 410, next pixels 430, and current pixels 420. Previous pixels 410 and next pixels 430 may be aligned to a missing pixel between pixels 'p' and 'q' in current pixels 420. For example, pixel 'b' of previous pixels 410 and pixel 'y' of next pixels 430 may be aligned to the missing pixel between pixels 'p' and 'q' in current pixels 420. The missing pixel in current pixels 420 may be a pixel in a line that is absent from a field—e.g. a line of even numbered horizontal pixels in a field that includes all odd numbered horizontal pixels.

Setup 400 may be used to calculate motion and detail information between successive fields. With reference to the value of pixels 'a', 'b', 'c', 'l', 'm', 'p', 'q', 'x', 'y', and 'z' in setup 400, the following metrics may be calculated:

max_motion−max_detail (EQ. 1)

max_motion−min_detail (EQ. 2)

min_motion−max_detail (EQ. 3)

min_motion−min_detail (EQ. 4)

max_motion (EQ. 5)

min_motion (EQ. 6)

where
max_motion=max[abs(avg(p,q)−b), abs(avg(p,q)−y)]
min_motion=min[abs(avg(p,q)−b), abs(avg(p,q)−y)]
max_detail=max[abs(a−b), abs(b−c), abs(p−q), abs(x−y), abs(y−z)]
and
min_detail=min[abs(a−b), abs(b−c), abs(p−q), abs(x−y), abs(y−z)]

The function abs( ) may indicate any suitable absolute value function, the function max( ) may represent any suitable maximum value function, and the function min( ) may represent any suitable minimum value function.

The differences in EQs 1-4 may be represented as zero if they are calculated to be negative. In addition, the values calculated in EQs 1-6 may be scaled to four bit values similar to the process disclosed with respect to setup 300 in FIG. 3.

Setup 400 may also be used to calculate field motion using merged sets of pixels between fields. In certain embodiments, the current pixels 420 and previous pixels 410 may be merged as shown to form a current and previous merged field 440. In addition, the current pixels 420 and next pixels 430 may be merged as shown to form a current and next merged field 450.

Setup 400 may be used to calculate interfield differences. The interfield differences may be calculated by weighting the values of pixels in setup 400 by a weighting factor. Absolute differences between weighted pixel values may be calculated. A binary motion value may be calculated using the absolute differences and programmable gain and threshold values. The programmable gain and threshold values may be selected to control the importance given to particular spatial details in calculating interfield motion. The calculated interfield differences may be used as pixel field motion flags to detect film cadences.

Figure 5A:
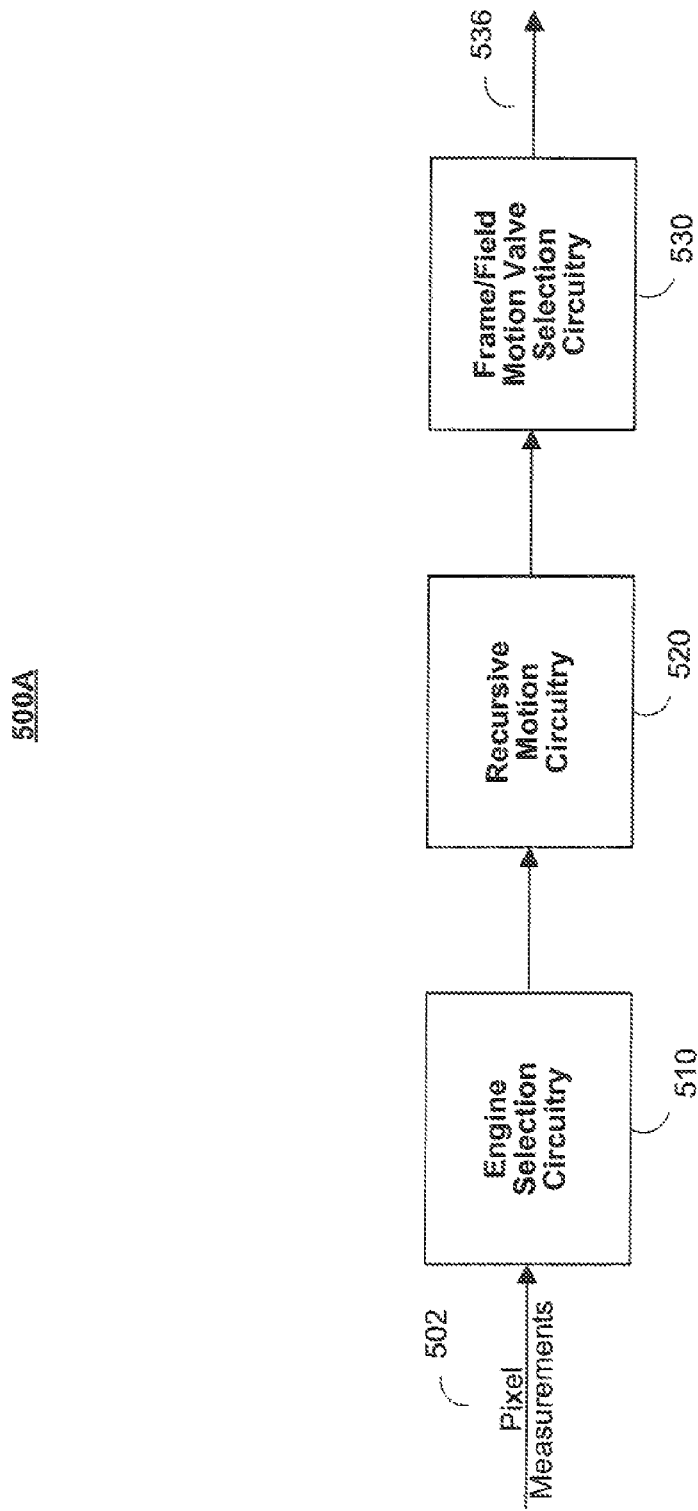
FIG. 5A shows an illustrative top-level block diagram of video motion combiner circuitry in accordance with one embodiment of the invention.

FIG. 5A shows an illustrative top-level block diagram of video motion combiner circuitry 500A in accordance with one embodiment of the invention. Video motion combiner circuitry 500A may be similar to video motion combiner 124 disclosed in FIG. 1B. Video motion combiner circuitry 124 may take pixel measurements 502 as input. Pixel measurements 502 may include frame motion information computed by the video motion engines disclosed in FIG. 3. Video motion combiner circuitry 500A may take the frame motion information from the video motion engines and process them to create luma motion value and chroma motion value output 536.

Video motion combiner circuitry 500A may include engine selection circuitry 510. Engine selection circuitry 510 may select which frame motion information to process from the video motion engines. The selection may be based on the detail in the pixels surrounding the pixel for which motion information is being calculated. The selected frame motion information may be passed to recursive motion circuitry 520 for further processing.

Recursive motion circuitry 520 may take the frame motion information as input. The frame motion information may be processed with motion information from previous fields. A weighted average function may be applied to the frame motion information and the motion information from previous fields. The weighted average function may be applied when the current frame motion is smaller in value than the motion information from previous fields. This processing may be referred to as motion recursion. The motion recursion may provide temporal motion expansion. The processed frame motion information may be passed to frame/field motion value selection circuitry 530 for further processing.

Frame/field motion value selection circuitry 530 may take processed frame motion information from recursive motion circuitry 520 as input. Frame/field motion value selection circuitry 530 may output the processed field motion information when it detects a high level of motion throughout the frames of video that are currently being deinterlaced. A high level of motion may be detected when the processed frame motion information exceeds a selected threshold. However, when a high level of motion is not detected, frame/field motion value selection circuitry 530 may output frame motion information. The field motion information may include information computed as disclosed in FIG. 4. This selection process may limit the deinterlacer's susceptibility to using incorrect field motion information when there is a low level of motion throughout the frames of video that are being deinterlaced.

Figure 5B:
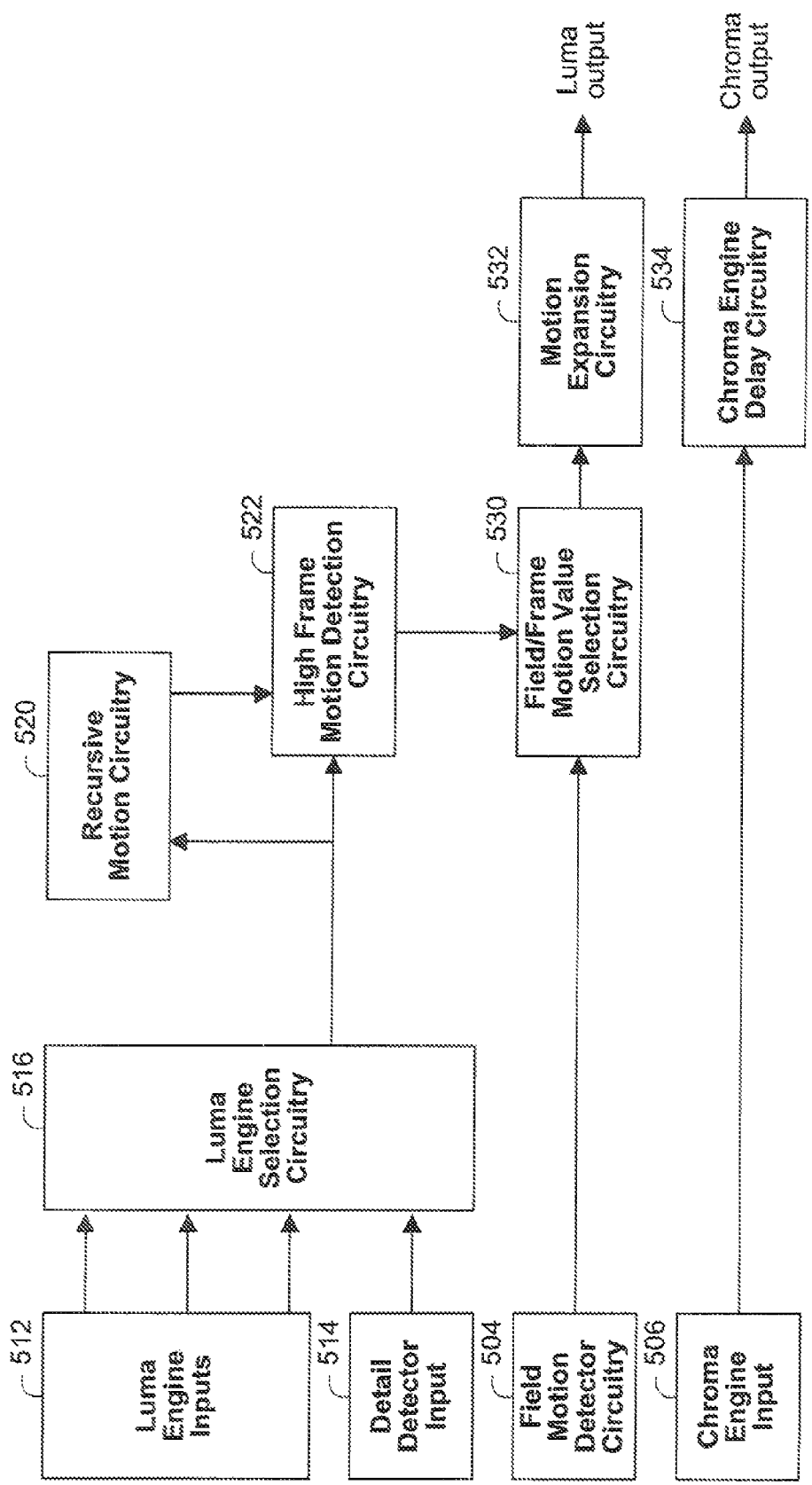
FIG. 5B shows a more detailed top-level block diagram of video motion combiner circuitry in accordance with one embodiment of the invention.

FIG. 5B shows a more detailed top-level block diagram of video motion combiner circuitry in accordance with one embodiment of the invention. Video motion combiner circuitry may include luma engine selection circuitry 516. Luma engine selection circuitry 516 may select between luma engine inputs 512. Luma inputs 512 may include luma frame motion information computed by the video motion engines disclosed in FIG. 3. The selection may be based on information sent to luma engine selection circuitry 516 by detail detector circuitry 514. Detail detector circuitry 514 may compute a value to indicate the level of detail surrounding the pixel for which motion information is currently being processed. This computation may be based on the variation in pixel values surrounding the pixel for which motion information is currently being processed. In certain embodiments, frame motion information that includes the maximum of absolute differences of pixels may be used when there is not much variation in pixel values, i.e. a flat region of pixels. In addition, frame motion information that includes the mean of absolute differences of pixels may be used when there is a high level of variation in pixel values. The mean of absolute differences may be calculated using any size kernel as disclosed in FIG. 3. A binary value may be assigned to each pixel in the kernel. The binary value may be set to one if the value of the pixel exceeds the calculated mean by a programmable threshold. The total number of pixels having a binary value of one may be calculated. The output of the detail detector may indicate whether this value exceeds a programmable threshold. This selection process may limit the expansion of noise in the deinterlaced frames of video by preventing noise-ridden motion information from propagating to neighboring frames. Luma engine selection circuitry 516 may output the selected luma frame motion and pass it to recursive motion circuitry 520 and high frame motion detection circuitry 522.

Figure 5C:
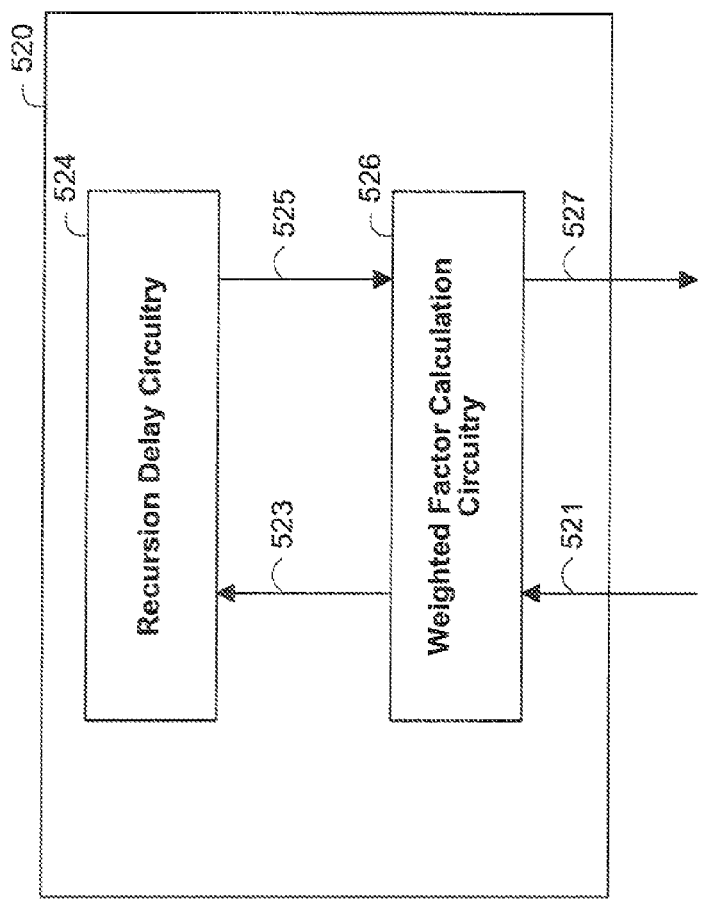
FIG. 5C shows an illustrative top-level block diagram of recursive motion circuitry in accordance with one embodiment of the invention.

FIG. 5C shows a top-level block diagram of recursive motion circuitry 520 in accordance with one embodiment of the invention. Recursive motion circuitry 520 may use selected luma frame motion information 521 as input to luma engine selection circuitry 516 and outputs recirculated/recursive frame motion information 527 as output. Luma frame motion information 521 may be input into weighted factor calculation circuitry 526.

Weighted factor calculation circuitry 526 may apply a weighted average function to luma frame motion information 521. In addition, weighted factor calculation circuitry 526 may selectively pass luma frame motion information 521 to recursion delay circuitry 524 via upstream recursion line 523. Recursion delay circuitry 524 may be part of temporal and spatial tap circuitry 110 disclosed in FIG. 2A. Recursion delay circuitry 524 may create delayed versions of luma frame motion information 521. In certain embodiments, recursion delay circuitry 524 may create a one field delayed version and a two field delayed version of luma frame motion information 521. Due to the odd and even nature of the video fields, the one field delayed version of the luma frame motion 521 may not be spatially aligned to the pixel for which motion information is being calculated. However, the two field delayed version of the luma frame motion 521 may be spatially aligned to the pixel for which motion information is being calculated. Recursion delay circuitry may send the appropriate version of the luma frame motion information via downstream recursion line 525 to weighted factor calculation circuitry 526.

Weighted factor calculation circuitry 526 may temporally expand the luma frame motion information 521 by applying a weighted average function to the luma frame motion information 521 and the delayed versions of the luma frame motion information 521 created in recursion delay circuitry 524. The weighted average function may include a programmable weighting factor. The weighting factor may range from 0 and 1. The output of the weighted average function may be sent to high frame motion detection circuitry 522 as recirculated/recursive frame motion information 527.

In certain embodiments, recursive motion circuitry 520 may perform asymmetric recursion. For example, the weighted factor calculation circuitry 526 may temporally expand the luma frame motion information 521 by applying a weighted average function to the luma frame motion information 521 and the delayed versions of the luma frame motion information 521 only if motion information in the previous frame is lower in magnitude than the motion information in the current frame.

Referring back to FIG. 5B, high frame motion detection circuitry 522 may take recirculated/recursive frame motion information 527 and information from the luma engine selection circuitry 516 as input and output frame motion information along with an indication of the level of frame motion in the frame of video. This information may be passed to field/frame motion value selection circuitry 530. Field/frame motion value selection circuitry 530 may select between the frame motion information and the field motion information from field motion detector circuitry 504 based on the indication of frame motion from the high frame motion detection circuitry 522. Field motion detector circuitry 504 may compute information as disclosed in FIG. 4. The selected information may be passed to motion expansion circuitry 532.

Motion expansion circuitry 532 can take the selected field or frame motion information as input. The selected field of frame motion may be expanded horizontally. The processed field or frame motion may be output as the luma output of the video motion combiner.

The video motion combiner circuitry may also include a chroma engine input 506. Chroma engine input 506 may include chroma frame motion information computed by the video motion engines disclosed in FIG. 3. Chroma engine input 506 may be delayed in the video motion combiner circuitry by chroma engine delay circuitry 534. Chroma engine delay circuitry 534 may output the delayed chroma engine input 506 as the chroma output of the video motion combiner. Chroma engine delay circuitry 534 may include any suitable delay circuitry to delay chroma engine input 506 to match up with the luma output of motion expansion circuitry 532.

Figure 6A:
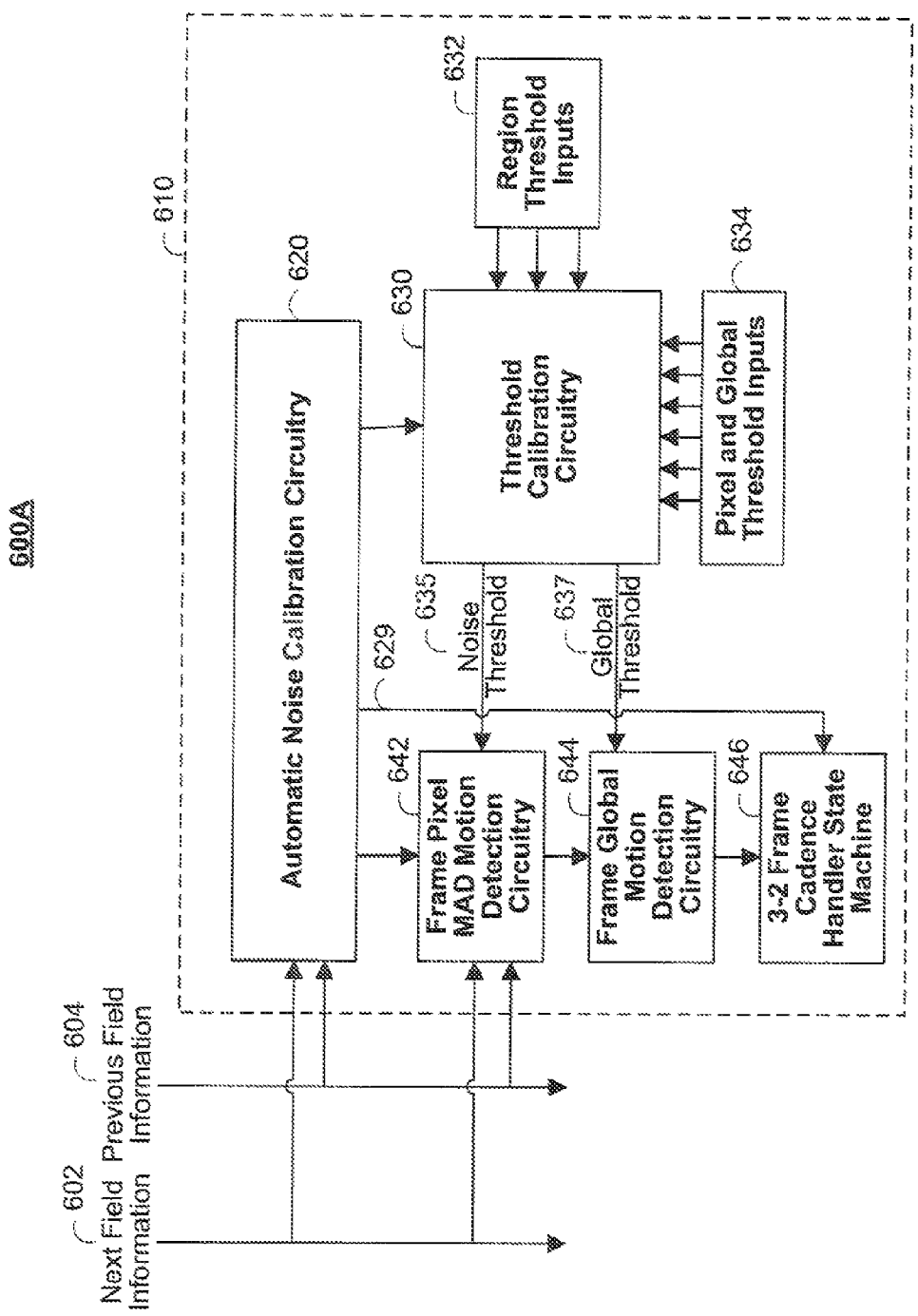
FIG. 6A shows an illustrative top-level block diagram of a frame pixel motion detection module in accordance with one embodiment of the invention.

FIG. 6A shows a top-level block diagram 600A of a frame pixel motion detection module 610 in accordance with one embodiment of the invention. In some embodiments, frame pixel motion detection module 610 may be part of film cadence handler 132 as disclosed in deinterlacer circuitry 100A of FIGS. 1A and 1B. In other embodiments, frame pixel motion detection module 610 may be part of motion adaptive blender 134 as disclosed in deinterlacer circuitry 100A of FIGS. 1A and 1B. Frame pixel motion detection module 610 may take next field information 602 and previous field information 604 as input from temporal and spatial motion taps 110 disclosed in FIG. 1B. In addition, frame pixel motion detection module 610 may take region threshold inputs 632 and pixel and global threshold inputs 634 as input. Region threshold inputs 632 and pixel and global threshold inputs 634 may be programmable by the deinterlacer.

Frame pixel motion detection module 610 may include threshold calibration circuitry 630. Threshold calibration circuitry 630 may take region threshold inputs 632 and pixel and global threshold inputs 634 and calibrate noise threshold 635 and global threshold 637. Noise threshold 635 may indicate the level of noise in the frames of video that are being deinterlaced. Threshold calibration circuitry 630 may set noise threshold 635 to a higher value when its inputs indicate that there is a high level of noise. Noise threshold 635 may determine when the deinterlacer enters and exits film mode. Noise threshold 635 may be sent to frame pixel MAD motion detection circuitry 642. Global threshold 637 may be selected from the pixel and global threshold inputs inputs 634.

Figure 6B:
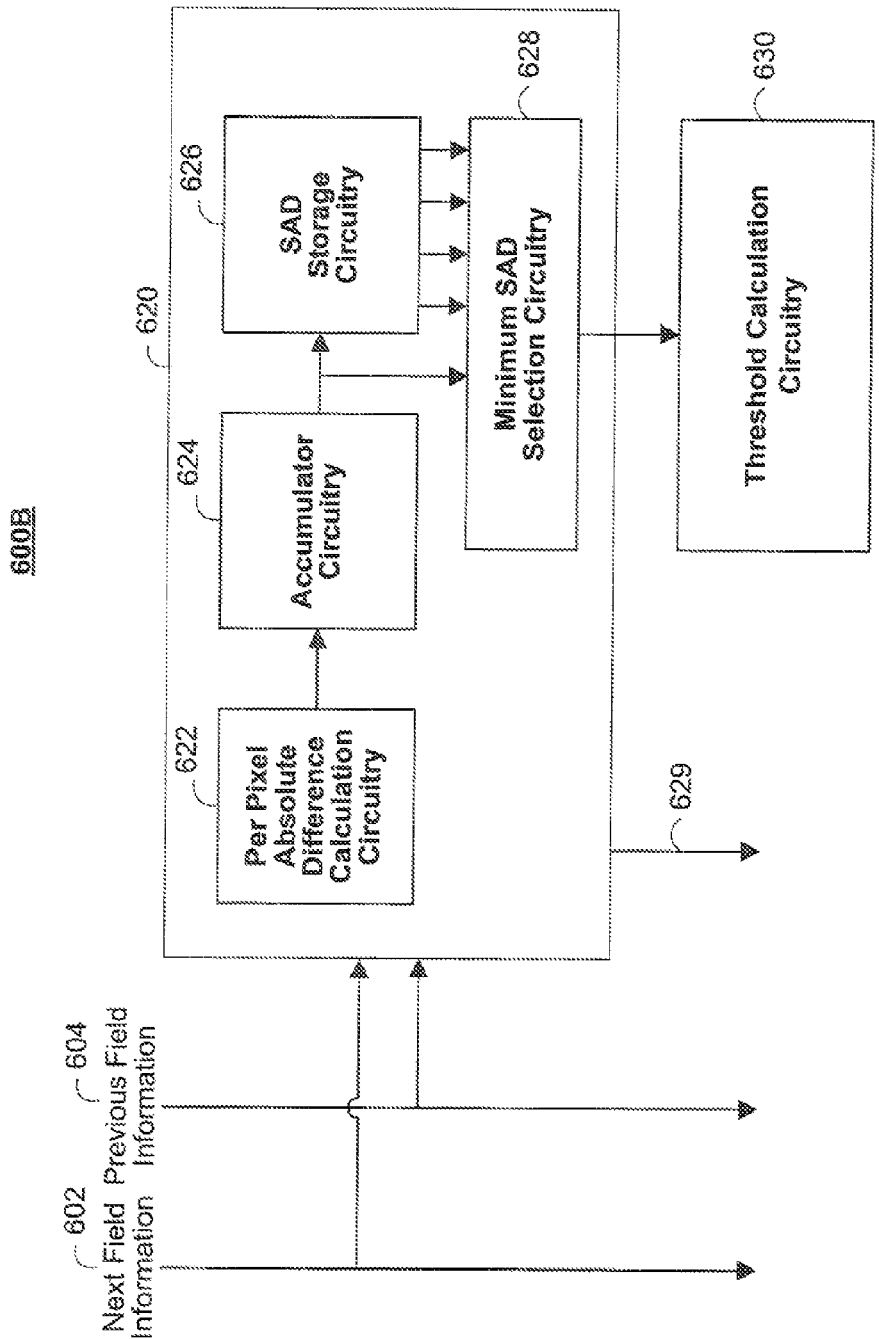
FIG. 6B shows an illustrative top-level block diagram of automatic noise calibration circuitry in accordance with one embodiment of the invention.

Noise threshold 635 may be automatically calibrated by automatic noise calibration circuitry 620. FIG. 6B shows a top-level block diagram 600B of automatic noise calibration circuitry 620 in accordance with one embodiment of the invention. Automatic noise calibration circuitry 620 may include per pixel absolute difference calculation circuitry 622. Per pixel absolute difference calculation circuitry 622 may calculate a binary value for each pixel in the groups, or kernels, of pixels of next field information 602 and previous field information 604. The kernels may be similar to those disclosed in setup 300 of FIG. 3. This binary value may express whether the mean of absolute differences between the two kernels is higher than a programmable threshold. For example, if the mean for a particular set of kernels is higher than the threshold, the binary value may be one. Otherwise, the binary value may be zero.

Per pixel absolute difference calculation circuitry 622 may also calculate the sum of absolute differences, or SAD, between the kernels of pixels in next field information 602 and previous field information 604. For video with a 3-2 cadence, it is inherent that a pair of alternate fields, such as the next field information 602 and a previous field information 604, are similar over a period of five consecutive fields. The SAD value calculated for two matching fields may give an indication of the minimum amount of noise in a particular sequence of video. Thus, accumulator circuitry 624 may accumulate multiple SAD values and store them in SAD storage circuitry 626. SAD storage circuitry 626 may comprise flip-flops, latches, or any register circuitry. The multiple SAD values may be sent to minimum SAD selection circuitry 628. Minimum SAD selection circuitry may select the minimum SAD value out of the input SAD values The minimum SAD value may then be sent to threshold detection circuitry 630 for further processing.

In certain embodiments, automatic noise calibration circuitry 620 may calculate the position of the minimum SAD value in the sequence of fields whose SAD values are stored in SAD storage circuitry 626. This value may be output as minimum SAD value position 629.

Referring back to FIG. 6A, threshold detection circuitry 630 may compare the minimum SAD value to region threshold inputs 632. In one embodiment, the minimum SAD value may be compared to three different thresholds. In other embodiments, the minimum SAD value may be evaluated against one, two, three, five, or more than five thresholds. These comparisons may determine what threshold may be output as noise threshold 635 and global threshold 637 for a particular region of a frame. These thresholds may be programmed when deinterlacing begins initially. These thresholds may be programmed to be higher in sequences of video that the deinterlacer anticipates will be have a higher amount of noise.

Frame pixel MAD motion detection circuitry 642 may take noise threshold 635, next field information 602, and previous field information 604 as input and output a value indicating the amount of pixel motion in the frames of video being processed by the deinterlacer. Frame pixel MAD motion detection circuitry may use next field information 602 and previous field information 604 to calculate the mean of absolute differences, or MAD, between kernels of pixels in the next field and the previous field similar to the approach disclosed in FIG. 3. The MAD value may be compared to noise threshold 635. This comparison may be used to create an output indicating the amount of pixel motion in the frames of video being processed. For example, if the MAD value is less than noise threshold 635, the output of frame pixel MAD motion detection circuitry 642 may indicate that there is a low amount of pixel motion in the frames of video being processed by the deinterlacer. Conversely, if the MAD value is greater than noise threshold 635, the output of frame pixel MAD motion detection circuitry 642 may indicate that there is a high amount of pixel motion in the frames of video being processed by the deinterlacer. Frame pixel MAD motion detection circuitry 642 may pass this output to frame global motion detection circuitry 644.

Frame global motion detection circuitry 644 may take global threshold 637 and output from frame pixel MAD motion detection circuitry 642 and output a value indicating the amount of global frame motion in the frames of video being processed by the deinterlacer. This output may be sent to 3-2 frame cadence handler state machine 644. For example, frame global motion detection circuitry 644 may sum pixel motion information from frame pixel MAD motion detection circuitry 642 and compare the sum to the global threshold 637. This comparison may set a global frame motion flag. The global frame motion flag may then be used in the 3-2 frame cadence handler state machine to detect changes in film cadences.

3-2 frame cadence handler state machine 646 may use minimum SAD value position 629 and the output from frame global motion detection circuitry 644 as input in order to determine whether to exit from film mode. In certain embodiments, the 3-2 frame cadence handler state machine 646 may exit out of film mode if the position of the minimum SAD value does not occur in a continuous shifting position across several fields. In addition, the 3-2 frame cadence handler may enter into film mode when the minimum SAD value position 629 occurs in a continuous shifting position across several consecutive fields. The amount of consecutive fields may be defined as 5. A continuous shifting position may be defined as the position incrementing by one every state machine transition period. The state machine transition period may be defined as the processing time that the state machine takes to transition between states. Thus, the deinterlacer will exit out of film mode if there is a video sequence that contains little motion between successive frames, and enter into film mode if there is a video sequence that contains a signature indicative of a 3-2 cadence. This entry and exit into film mode occurs without the use of any thresholds in frame pixel motion detection module 610.

Figure 7:
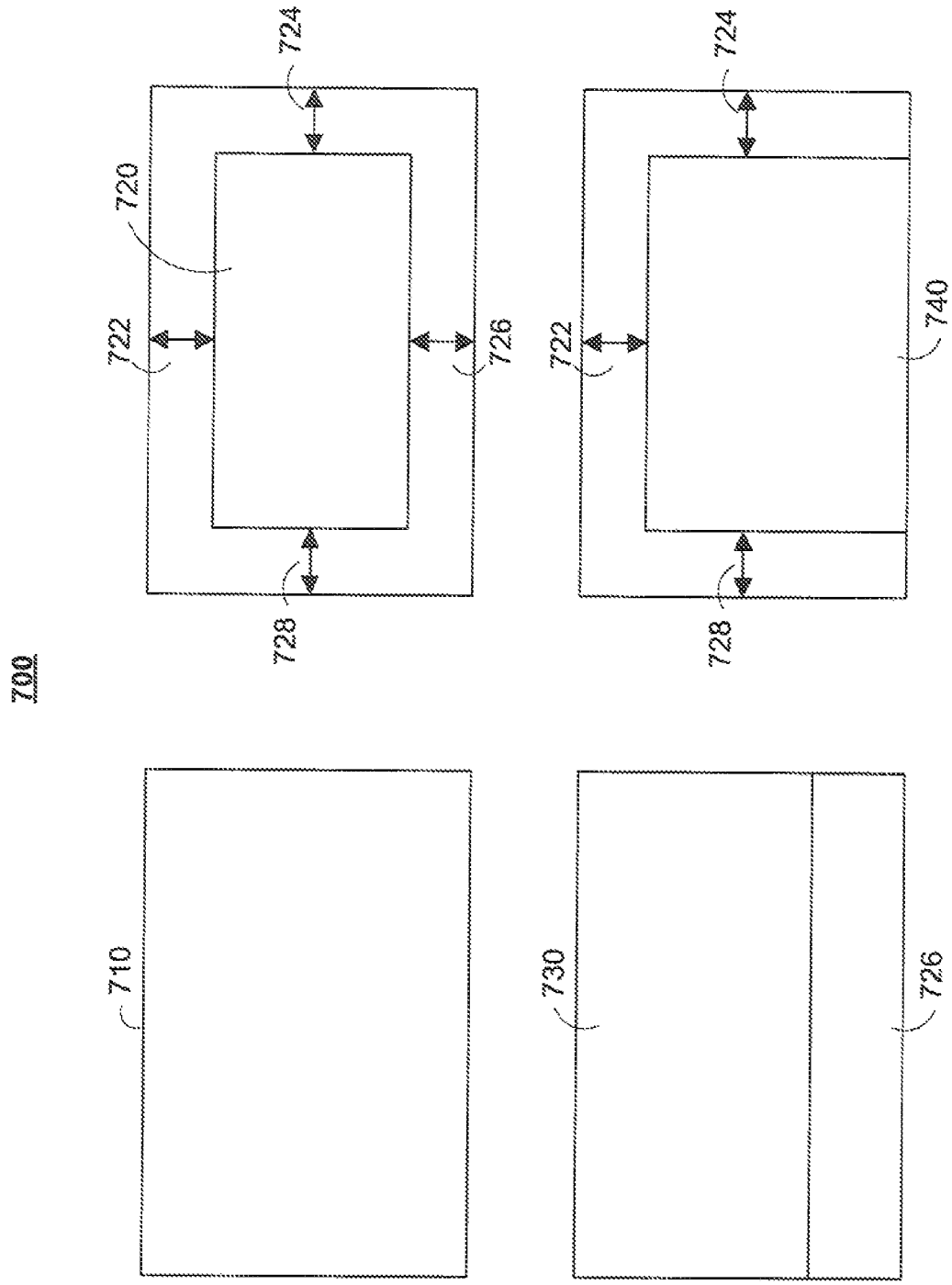
FIG. 7 shows an illustrative diagram of boundary exclusion windows in accordance with some embodiments of the invention.

FIG. 7 shows a diagram of boundary exclusion windows 710, 720, 730, and 740 in accordance with some embodiments of the invention. Boundary exclusion windows 710, 720, 730, and 740 may be used in vector interpolator 126 to exclude regions of the frame that contain missing or garbage pixels. These regions may include the borders of each field processed by the deinterlacer. Boundary exclusion windows 710, 720, 730, and 740 may be constructed by boundary exclusion registers 722, 724, 728, and 726. The boundary exclusion registers may be any suitable register hardware that stores a table of positions of a frame that are to be excluded in a particular boundary exclusion window. These boundary pixels may cause erroneous exits from film and video modes. Thus, it is important that they be used to exclude portions of the fields that may contain missing or garbage pixels.

Global boundary exclusion window 710 includes an entire frame. Shrunken global boundary exclusion window 720 includes an entire frame less the pixels stored in top boundary exclusion register 722, left boundary exclusion register 728, bottom boundary exclusion register 728, and right boundary exclusion register 724. Top boundary exclusion window 730 includes an entire frame less the pixels stored in bottom boundary exclusion register 726. Reduced global boundary exclusion window 740 includes an entire frame less the pixels stored in top boundary exclusion register 722, left boundary exclusion register 728, and right boundary exclusion register 724.

In certain embodiments, two sets of cadence detection circuitry may be applied to a frame. Thus, if scrolling text appears at the bottom of top boundary exclusion window 730, the bottom region of the frame defined by bottom boundary exclusion register 726 will enter video mode while the top portion of the frame will remain in 3-2 film mode.

Figure 8:
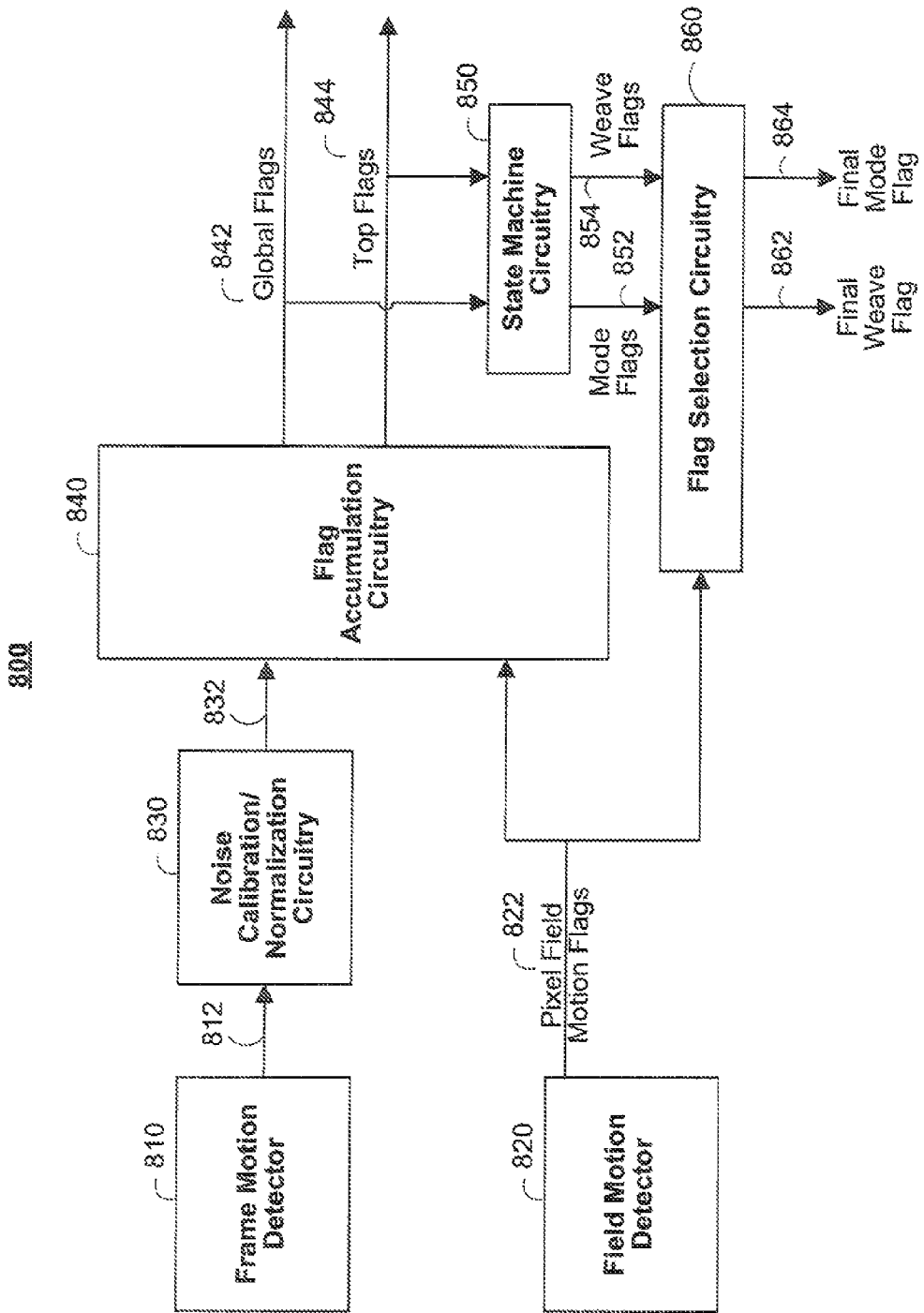
FIG. 8 shows an illustrative top-level block diagram of a film cadence handler module in accordance with one embodiment of the invention.

FIG. 8 shows a top-level block diagram of a film cadence handler module 800 in accordance with one embodiment of the invention. The film cadence handler module 800 may be similar to film cadence handler 132 disclosed in FIG. 1B. Film cadence handler module 800 may take input from frame motion detector 810 and field motion detector 820. These two detectors may include the frame motion and field motion engines disclosed with respect to motion engines 112 in FIG. 1B and detailed in FIGS. 3 and 4.

Frame motion detector 810 may send frame motion information 812 to noise calibration/normalization circuitry 830. Noise calibration/normalization circuitry 830 may normalize frame motion information 812 with any suitable normalization circuitry. Frame motion information 812 may include pixel frame motion flags. The pixel frame motion flags may be calculated with similar techniques as the flags calculated by detail detector 114 disclosed in FIG. 5B. The normalization circuitry may scale frame motion information 812 with similar techniques as disclosed with respect to FIG. 3. Noise calibration/normalization circuitry 830 may also include automatic noise calibration circuitry. The automatic noise calibration circuitry may calculate a frame motion threshold using the mean of absolute differences between kernels of pixels in the next frame and the previous frame. This process may be that disclosed with respect to automatic noise calibration circuitry 620 in FIGS. 6A and 6B. The normalized frame motion information, pixel frame motion flags, and frame motion threshold may be sent as noise calibration/normalization circuitry output 832 to flag accumulation circuitry 840.

Field motion detector 820 may generate pixel field motion flags 822. Pixel field motion flags 822 may be computed with similar techniques as disclosed in FIG. 4. Pixel field motion flags 822 may be sent to flag accumulation circuitry 840 and flag detection circuitry 860 to further aid in cadence detection.

In certain embodiments, the deinterlacer may use a number of field motion engines to calculate pixel field motion and a number of frame motion engines to calculate pixel frame motion. The number of field motion engines or frame motion engines may be equal to one, two, three, or more than three. The pixel field motion flags may be a two bit binary value. The least significant bit may indicate field motion between the current field that is being deinterlaced and the next field that will be deinterlaced. The most significant bit may indicate motion between the current field that is being deinterlaced and the previous field that was deinterlaced. The pixel frame motion flags may be a single binary bit that indicates motion between the next field that is being deinterlaced and the previous field that was deinterlaced.

Pixel field motion flags 822 and the pixel frame motion flags in noise calibration/normalization circuitry output 832 may accumulate in flag accumulation circuitry 840. Flag accumulation circuitry 840 may sort the incoming flags and output global flags 842 and top flags 844. Global flags 842 may be motion flags that pertain to the whole frame. Top flags 844 may be motion flags that pertain to only a top portion of the frame. The top portion of the frame may be defined similar to top boundary exclusion window 730 disclosed in FIG. 7. Global flags 842 and top flags 844 may be passed to state machine circuitry 850 and used to detect various cadences.

State machine circuitry 850 may examine the incoming global motion flags 842 and top flags 844 for patterns. These patterns may signal to the deinterlacer when to enter and exit particular cadence processing modes. State machine circuitry 850 may comprise several state machines—one state machine per cadence that the deinterlacer is capable of detecting. These cadences may include 3-2, 2-2, 2-2-2-4, 2-3-3-2, 3-2-3-2-2, 5-5, 6-4, 8-7, or any programmable cadence. Each state machine in state machine circuitry 850 may produce a mode flag and a weave flag as output. The mode flag may be a single binary bit that indicates that the video currently being processed by the deinterlacer is of a particular cadence. The weave direction flag may be a sequence of binary bits that indicate to the deinterlacer when and how to weave together successive fields of a particular cadence that the deinterlacer is currently processing. The mode flags from all of the state machines in state machine circuitry 850 may be output as mode flags 852, and the weave flags in from all of the state machines in state machine circuitry 850 may be output as weave flags 854. Mode flags 853 and weave flags 854 may be sent to flag selection circuitry 860.

Flag selection circuitry 860 may assign priority to the cadences detected by the cadence state machine in state machine circuitry 850 when multiple weave flags become high at the same time. The priority assigned to each cadence may be used to resolve the final mode flag 864 and the final weave direction flag 862 that is output from flag selection circuitry 860. The final mode flag 864 may be selected from mode flags 852, and the final weave flag 862 may be selected from weave flags 854. The mode flag and the weave flag that are selected may be from the same cadence state machine. In one embodiment, the priority may be the following cadence order, from highest priority cadence to lowest priority cadence: 3-2, 2-2, 2-2-2-4, 2-3-3-2, 3-2-3-2-2, 5-5, 6-4, and 8-7.

Figure 9:
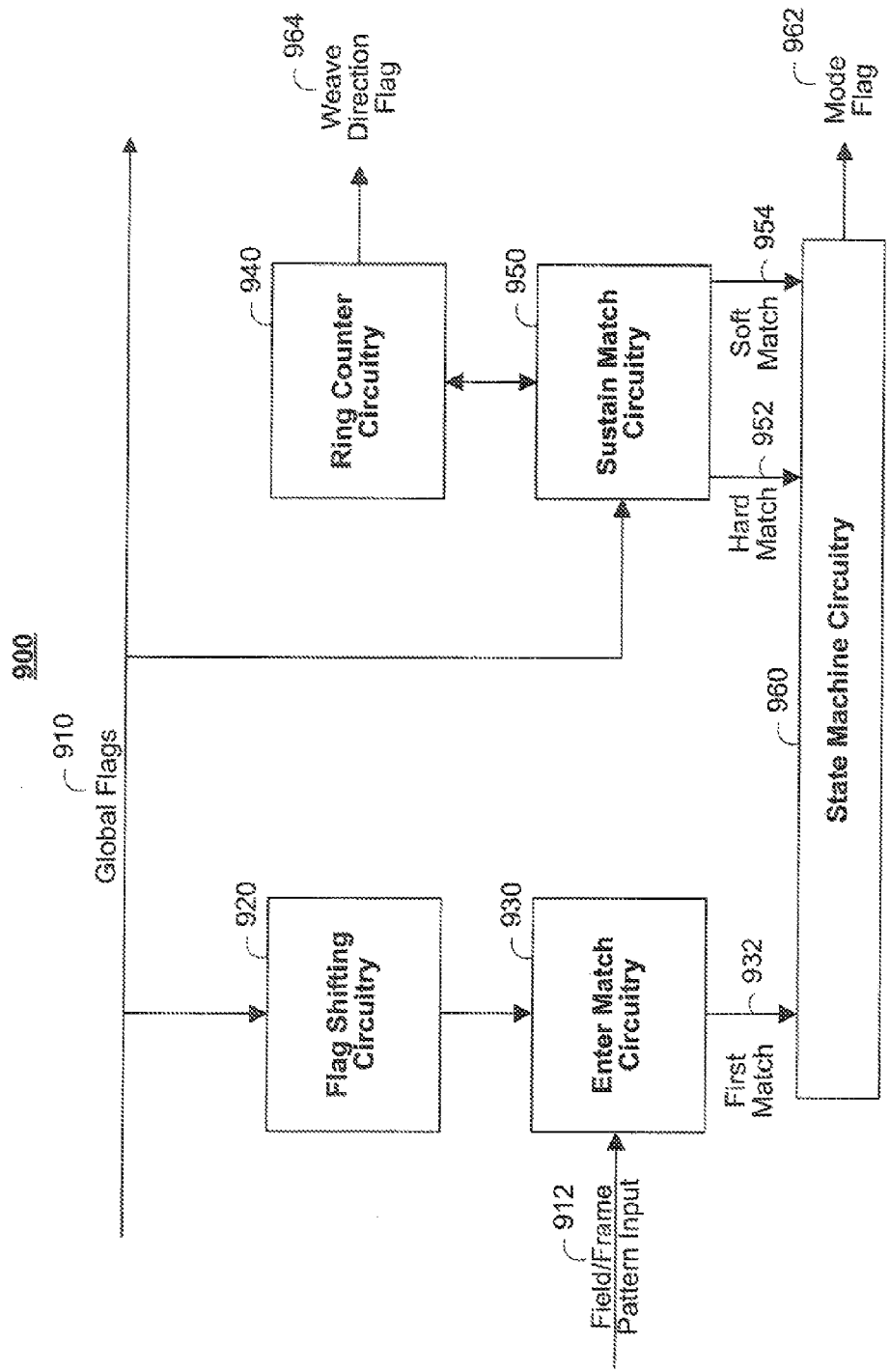
FIG. 9 shows an illustrative top-level block diagram of film cadence handler state machine circuitry in accordance with one embodiment of the invention.

FIG. 9 shows a top-level block diagram of film cadence handler state machine circuitry in accordance with one embodiment of the invention. The film cadence handler state machine circuitry depicted in FIG. 9 may be one state machine within state machine circuitry 850 disclosed in FIG. 8. In the state machines for a particular cadence, there may be two copies of the film cadence state machine circuitry—one to detect the cadence on the top portion of the frame, and one to detect the cadence on the bottom portion of the frame.

The film cadence handler state machine circuitry may use global flags 910 as input and detect patterns within sequences of successive flags. Global flags 910 may be similar to global flags 842 disclosed in FIG. 8. If a repeating pattern of flags is detected, the enter match circuitry 930 may set first match flag 932 high. First match flag 932 may signal to state machine circuitry 960 to assert a mode flag 962. The pattern may be set by field/frame pattern input 912. Mode flag 962 may indicate that the deinterlacer should process the upcoming frames assuming that they are of the particular cadence assigned to the film cadence handler state machine circuitry. Sustain match circuitry 950 may then check periodically to make sure that the repeating pattern persists. If there is a break in the repeating pattern, mode flag 962 may indicate that the upcoming frames are no longer of the particular cadence assigned to the film cadence handler state machine circuitry.

In certain embodiments, field/frame pattern input 912 may consist of a next field pattern and a previous field pattern. The next field pattern may specify the global motion of each field in a particular cadence cycle in comparison to the global motion in the next field temporally. The previous field pattern specifies the global motion of each field in a particular cadence cycle in comparison to the global motion in the previous field temporally. In addition, field/frame pattern input 912 may include a frame pattern. The frame pattern may be calculated as the bitwise logical OR operation of the next field pattern and the previous field pattern. The frame pattern may indicate the global motion between the next field and the previous field in the particular cadence cycle. In certain embodiments, the next field pattern, previous field pattern, and frame pattern may be hard wired in the film cadence handler state machine circuitry.

The next field pattern, previous field pattern, and frame pattern may be "hard patterns" in the sense that the patterns may not occur when there is no motion in the video being processed by the deinterlacer. Thus, these patterns may be used only to enter the particular cadence processing mode. Entry into a particular cadence processing mode may be signaled by hard match flag 952. The film cadence handler state machine may exit a particular cadence processing mode only when the global flags 910 indicate high overall motion in the frames of video that are being deinterlaced when the sustain match circuitry 950 expects a period of low overall motion. If this scenario occurs, sustain match circuitry 950 may set hard match flag 952 low. Sustain match circuitry 950 may also send the hard and soft match flags to ring counter circuitry 940.

In certain embodiments, global flags 910 may be passed through flag shifting circuitry 920. Flag shifting circuitry 920 may shift the global flags 910 by a period of time equal to the total number of fields in the cadence cycle. For example, for the 3-2 film cadence, flag shifting circuitry 920 may shift global flags 910 by a five field period.

Figure 10:
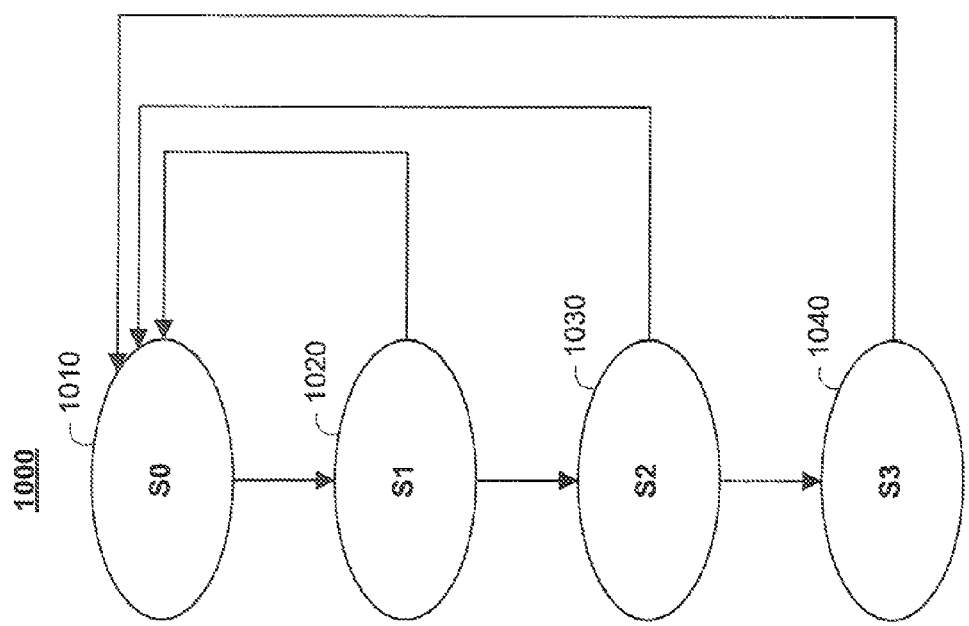
FIG. 10 shows an illustrative diagram of a film cadence handler state machine in accordance with one embodiment of the invention.

FIG. 10 shows a diagram of a film cadence handler state machine 1000 in accordance with one embodiment of the invention. State machine 1000 may be realized in hardware in state machine circuitry 960. The operation of the film cadence handler state machine depicted in FIG. 10 may now be described with reference to film cadence handler state machine circuitry in FIG. 9.

Ring counter circuitry 940 may maintain a cadence signature for each field or sets of fields for a particular cadence. As a new field is processed, the assigned signature may circularly shift. For example, if a 3:2 cadence is detected at a particular field, ring counter circuitry 940 may assign the fields in that cadence a cadence signature of 01111. When the next field of a different cadence is processed, ring counter circuitry 940 may assign the signature of the fields in the cadence a cadence signature of 11110. In some embodiments, the ring counter circuitry 940 may maintain an internal state. This internal state may be used to calculate weave direction flag 964.

Enter match circuitry 930 may check for the presence of a particular frame pattern in the shifted global flags. If an appropriate pattern is found, state machine 1000 transitions from state 1010 to state 1020. In addition, ring counter circuitry may update a previous field ring counter and a current field ring counter.

In state 1020, sustain match circuitry 950 may check global flags 910 against the particular frame pattern and the ring counters. Once the particular frame pattern has been matched N0 times, state machine 1000 may transition from state 1020 to state 1030. If there is a mismatch between the particular frame pattern and global flags 910, state machine 1000 may transition from state 1020 to state 1010. Soft match flag 954 may remain high as long as the particular frame pattern is matched.

In state 1030, sustain match circuitry 950 may check global flags 910 against the particular frame pattern and the ring counters. Once the particular frame pattern has been matched N1 times, state machine 1000 may transition from state 1030 to state 1040. If there is a mismatch between the particular frame pattern and global flags 910, state machine 1000 may transition from state 1030 to state 1010.

In state 1040, the mode flag 962 may be asserted high. In addition, weave direction flag 964 may calculated from the ring counter. State machine 1000 may remain in state 1040 until there is a mismatch between the particular frame pattern and global flags 910. After such a mismatch, state machine 1000 may transition from state 1040 to state 1010, and mode flag 962 and weave flag 964 may be reset.

Referring now to FIGS. 11A-11G, various exemplary implementations of the present invention are shown.

Figure 11A:
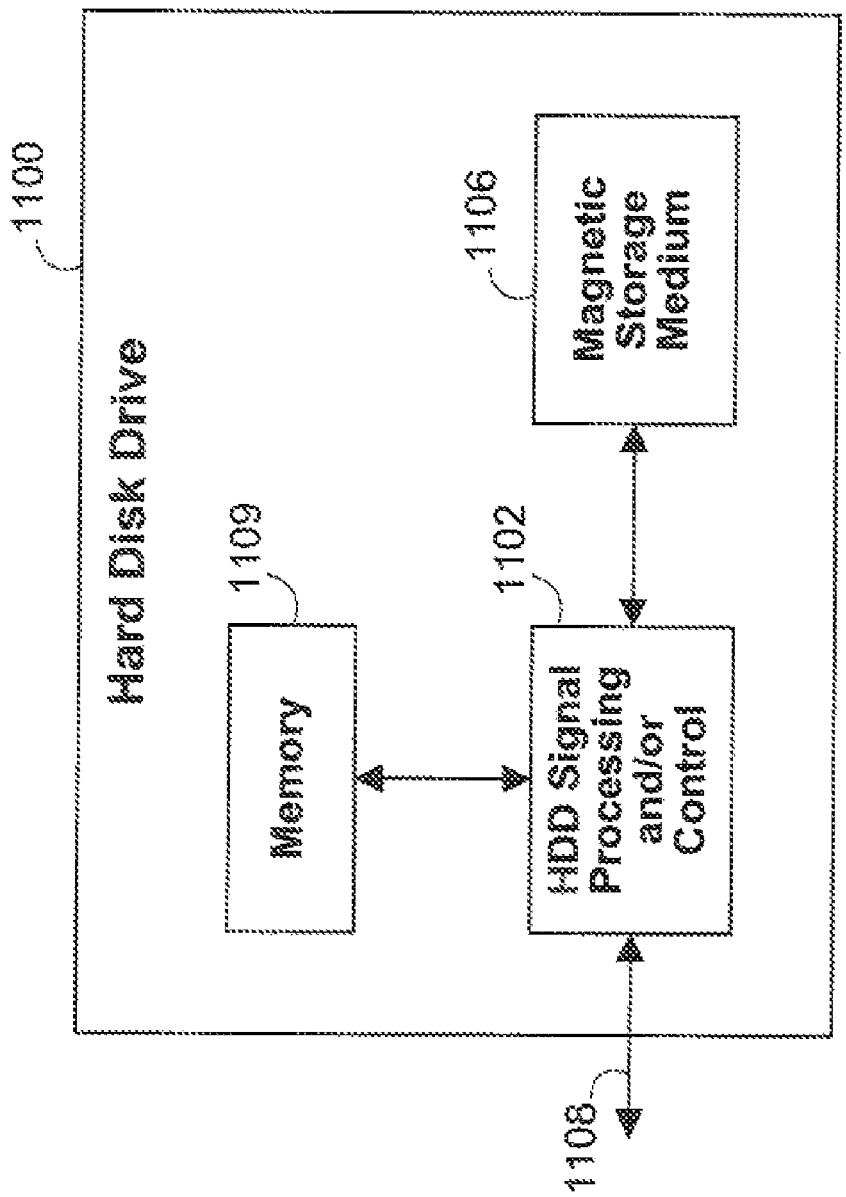
FIG. 11A shows a block diagram of an exemplary hard disk drive that can employ the disclosed technology.

Referring now to FIG. 11A, the present invention can be implemented in a hard disk drive 1100. The present invention may be implemented as part of the signal processing and/or control circuits, which are generally identified in FIG. 11A at 1102. In some implementations, the signal processing and/or control circuit 1102 and/or other circuits (not shown) in the HDD 1100 may process data, perform coding and/or encryption, perform calculations, and/or format data that is output to and/or received from a magnetic storage medium 1106.

The HDD 1100 may communicate with a host device (not shown) such as a computer, mobile computing devices such as personal digital assistants, cellular phones, media or MP3 players and the like, and/or other devices via one or more wired or wireless communication links 1108. The HDD 1100 may be connected to memory 1109 such as random access memory (RAM), low latency nonvolatile memory such as flash memory, read only memory (ROM) and/or other suitable electronic data storage.

Figure 11B:
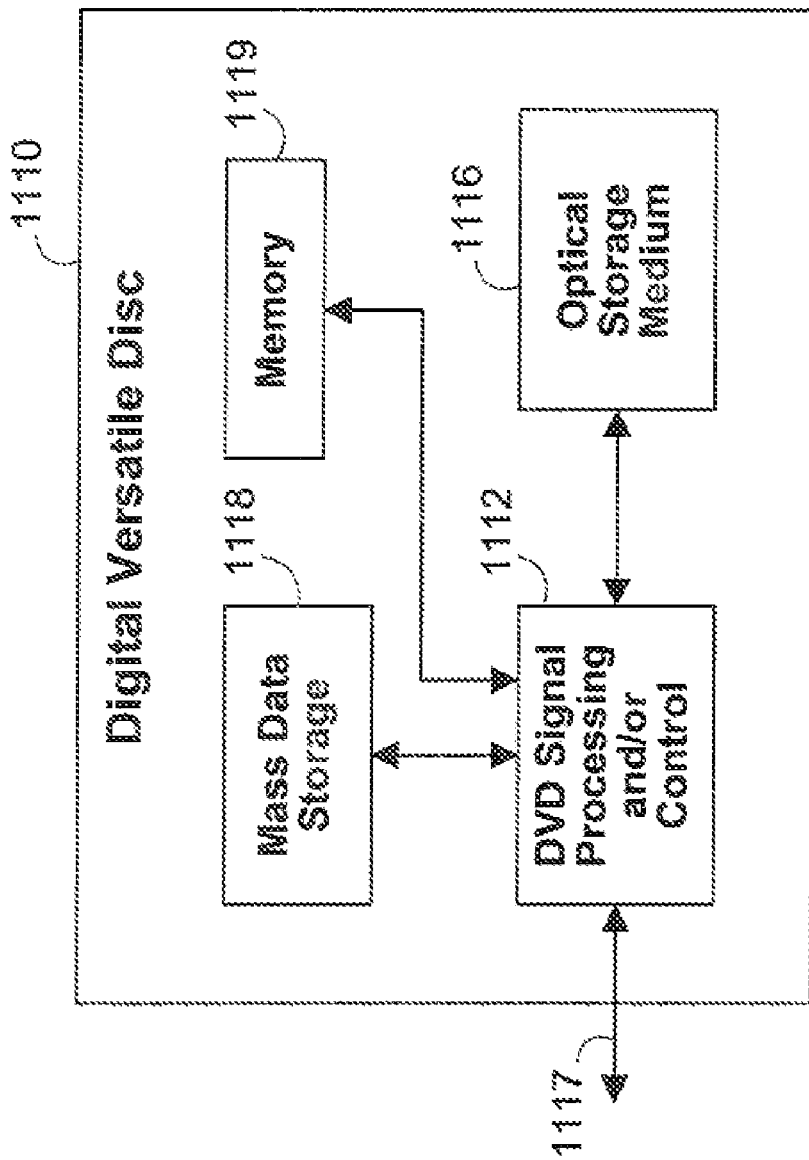
FIG. 11B shows a block diagram of an exemplary digital versatile disc that can employ the disclosed technology.

Referring now to FIG. 11B, the present invention can be implemented in a digital versatile disc (DVD) drive 1110. The present invention may be implemented as part of the signal processing and/or control circuits, which are generally identified in FIG. 11B at 1112, and/or mass data storage 1118 of the DVD drive 1110. The signal processing and/or control circuit 1112 and/or other circuits (not shown) in the DVD 1110 may process data, perform coding and/or encryption, perform calculations, and/or format data that is read from and/or data written to an optical storage medium 1116. In some implementations, the signal processing and/or control circuit 1112 and/or other circuits (not shown) in the DVD 1110 can also perform other functions such as encoding and/or decoding and/or any other signal processing functions associated with a DVD drive.

The DVD drive 1110 may communicate with an output device (not shown) such as a computer, television or other device via one or more wired or wireless communication links 1117. The DVD 1110 may communicate with mass data storage 1118 that stores data in a nonvolatile manner. The mass data storage 1118 may include a hard disk drive (HDD). The HDD may have the configuration shown in FIG. 11A. The HDD may be a mini HDD that includes one or more platters having a diameter that is smaller than approximately 1.8". The DVD 1110 may be connected to memory 1119 such as RAM, ROM, low latency nonvolatile memory such as flash memory and/or other suitable electronic data storage.

Figure 11C:
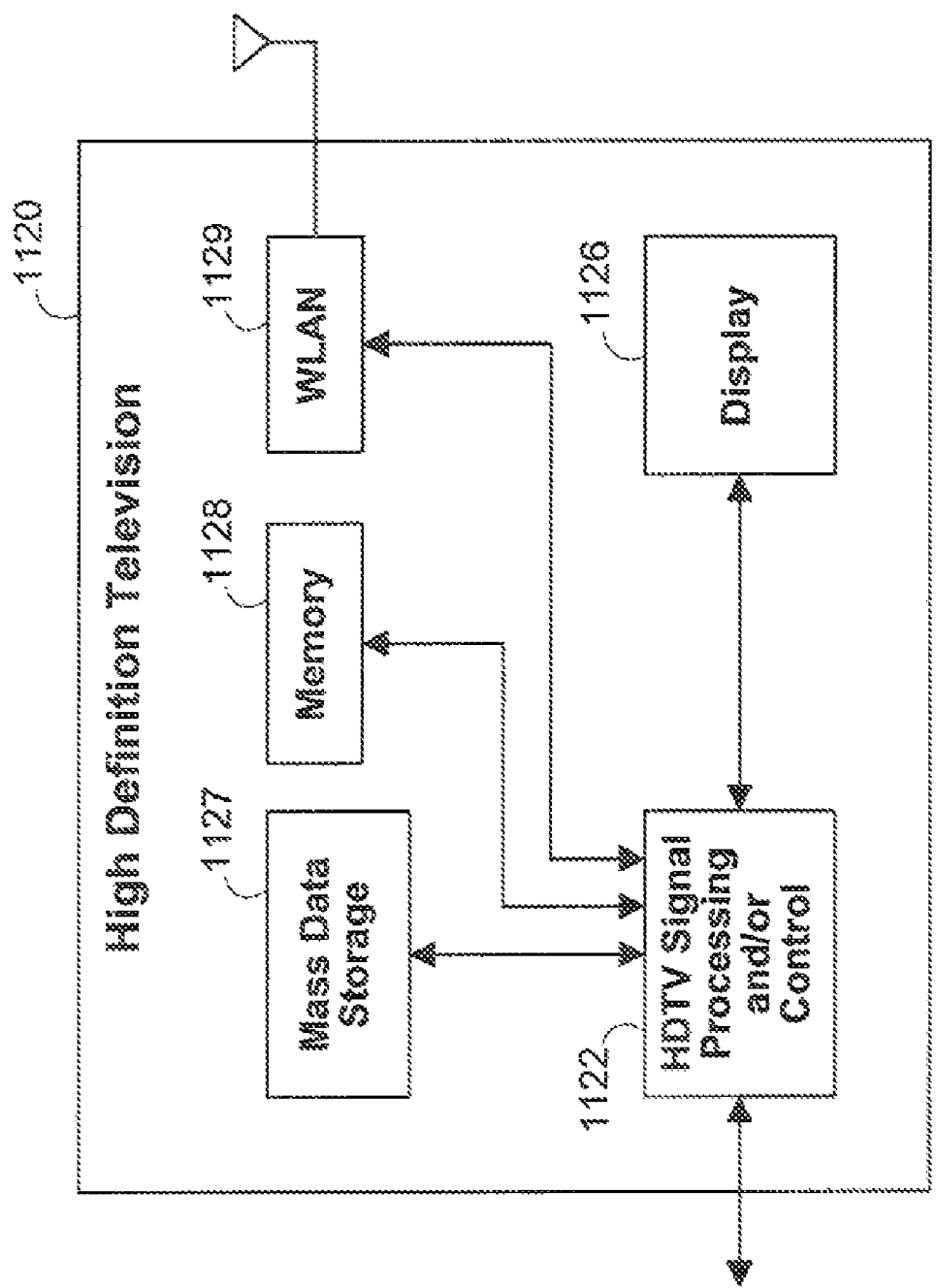
FIG. 11C shows a block diagram of an exemplary high definition television that can employ the disclosed technology.
Figure 11D:
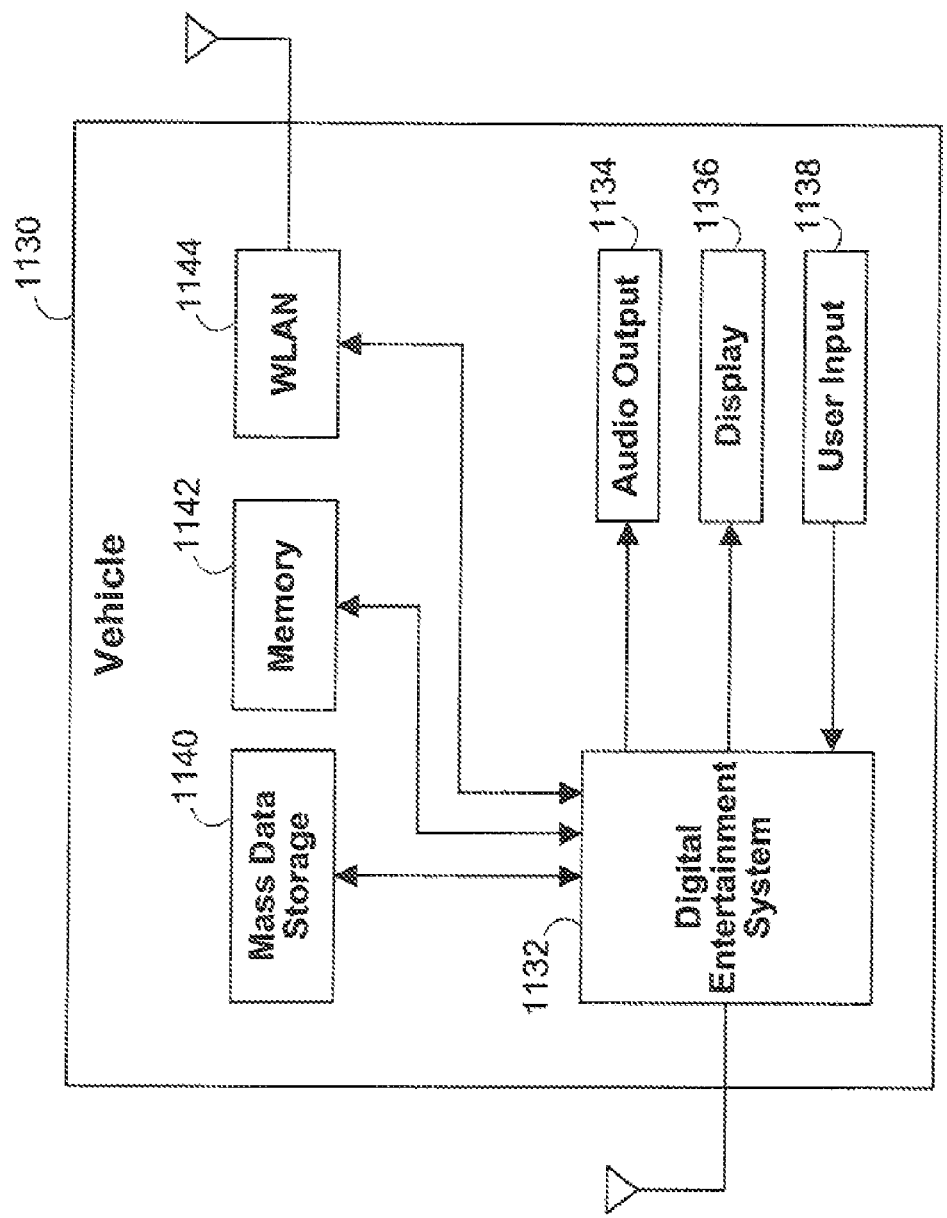
FIG. 11D shows a block diagram of an exemplary vehicle that can employ the disclosed technology.
Figure 11E:
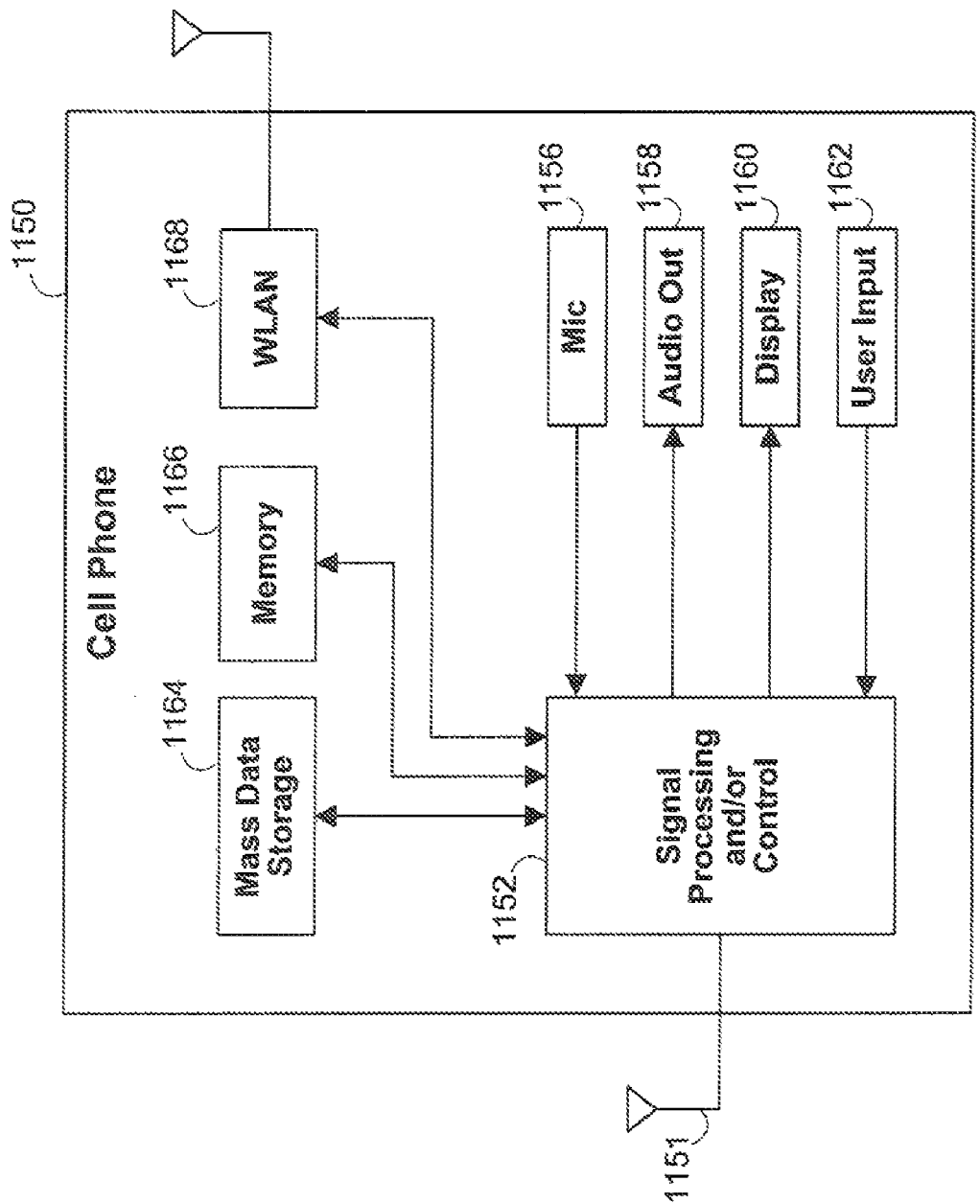
FIG. 11E shows a block diagram of an exemplary cell phone that can employ the disclosed technology.

Referring now to FIG. 11C, the present invention can be implemented in a high definition television (HDTV) 1120. The present invention may be implemented as part of the signal processing and/or control circuits, which are generally identified in FIG. 11C at 1122, a WLAN interface 1129 and/or mass data storage 1127 of the HDTV 1120. The HDTV 1120 receives HDTV input signals in either a wired or wireless format and generates HDTV output signals for a display 1126. In some implementations, signal processing circuit and/or control circuit 1122 and/or other circuits (not shown) of the HDTV 1120 may process data, perform coding and/or encryption, perform calculations, format data and/or perform any other type of HDTV processing that may be required.

The HDTV 1120 may communicate with mass data storage 1127 that stores data in a nonvolatile manner such as optical and/or magnetic storage devices for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". The HDTV 1120 may be connected to memory 1128 such as RAM, ROM, low latency nonvolatile memory such as flash memory and/or other suitable electronic data storage. The HDTV 1120 also may support connections with a WLAN via a WLAN network interface 1129.

Referring now to FIG. 1D, the present invention may be implemented in a digital entertainment system 1132 of a vehicle 1130, which may include a WLAN interface 1144 and/or mass data storage 1140.

The digital entertainment system 1132 may communicate with mass data storage 1140 that stores data in a nonvolatile manner. The mass data storage 1140 may include optical and/or magnetic storage devices such as hard disk drives (HDDs) and/or DVD drives. The HDD may be a mini HDD that includes one or more platters having a diameter that is smaller than approximately 1.8". The digital entertainment system 1132 may be connected to memory 1142 such as RAM, ROM, nonvolatile memory such as flash memory and/or other suitable electronic data storage. The digital entertainment system 1132 also may support connections with a WLAN via the WLAN interface 1144. In some implementations, the vehicle 1130 includes an audio output 1134 such as a speaker, a display 1136 and/or a user input 1138 such as a keypad, touchpad and the like.

Referring now to FIG. 1E, the present invention can be implemented in a cellular phone 1150 that may include a cellular antenna 1151. The present invention may be implemented as part of the signal processing and/or control circuits, which are generally identified in FIG. 11E at 1152, a WLAN interface 1168 and/or mass data storage 1164 of the cellular phone 1150. In some implementations, the cellular phone 1150 includes a microphone 1156, an audio output 1158 such as a speaker and/or audio output jack, a display 1160 and/or an input device 1162 such as a keypad, pointing device, voice actuation and/or other input device. The signal processing and/or control circuits 1152 and/or other circuits (not shown) in the cellular phone 1150 may process data, perform coding and/or encryption, perform calculations, format data and/or perform other cellular phone functions.

The cellular phone 1150 may communicate with mass data storage 1164 that stores data in a nonvolatile manner such as optical and/or magnetic storage devices for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". The cellular phone 1150 may be connected to memory 1166 such as RAM, ROM, low latency memory such as flash memory and/or other suitable electronic data storage. The cellular phone 1150 also may support connections with a WLAN via a WLAN network interface 1168.

Figure 11F:
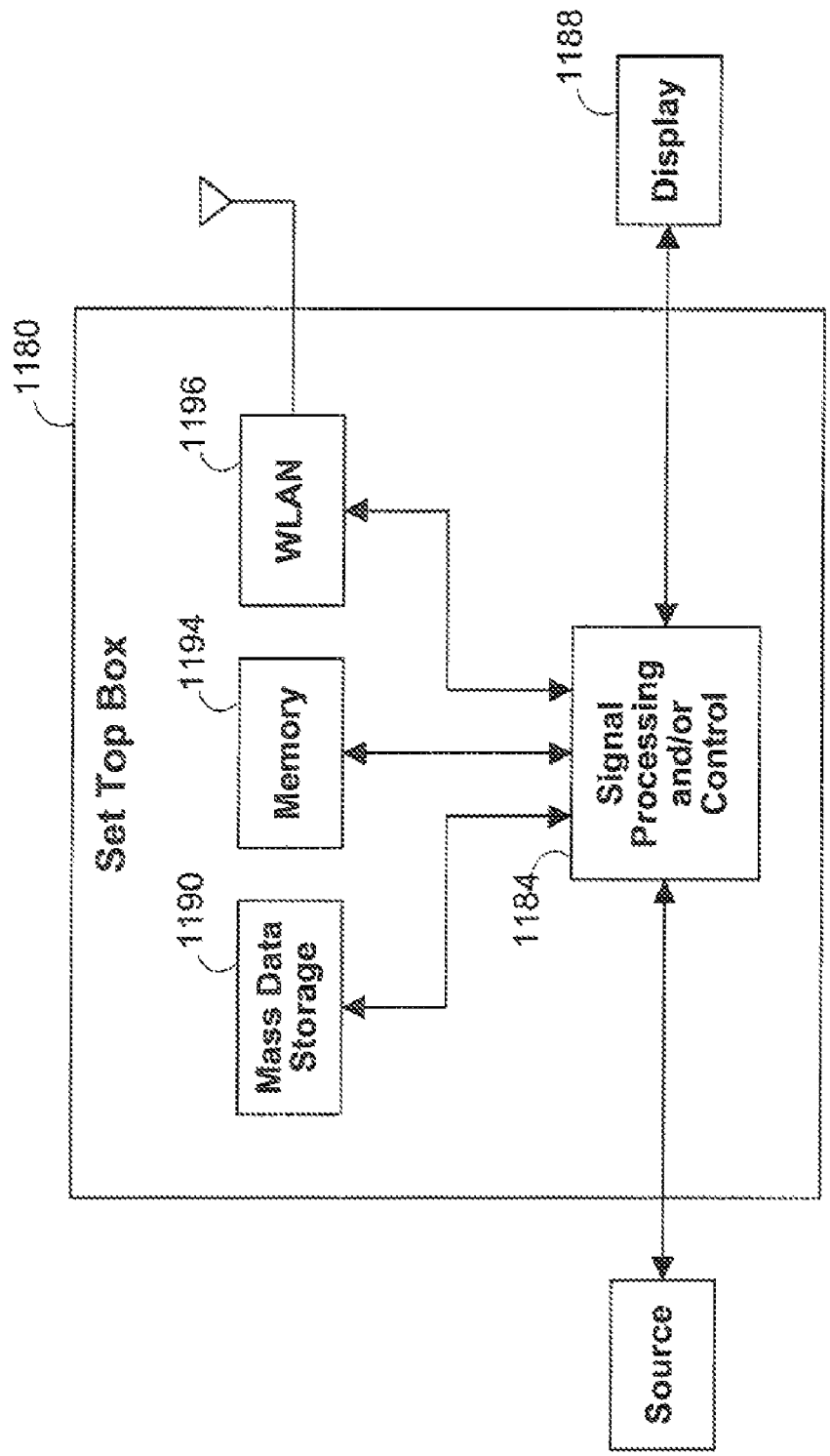
FIG. 11F shows a block diagram of an exemplary set top box that can employ the disclosed technology.

Referring now to FIG. 11F, the present invention can be implemented in a set top box 1180. The present invention may be implemented as part of the signal processing and/or control circuits, which are generally identified in FIG. 11F at 1184, a WLAN interface 1196 and/or mass data storage 1190 of the set top box 1180. The set top box 1180 receives signals from a source such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1180 may process data, perform coding and/or encryption, perform calculations, format data and/or perform any other set top box function.

The set top box 1180 may communicate with mass data storage 1190 that stores data in a nonvolatile manner. The mass data storage 1190 may include optical and/or magnetic storage devices—for example, hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". The set top box 1180 may be connected to memory 1194 such as RAM, ROM, low latency memory such as flash memory and/or other suitable electronic data storage. The set top box 1180 also may support connections with a WLAN via a WLAN network interface 1196.

Figure 11G:
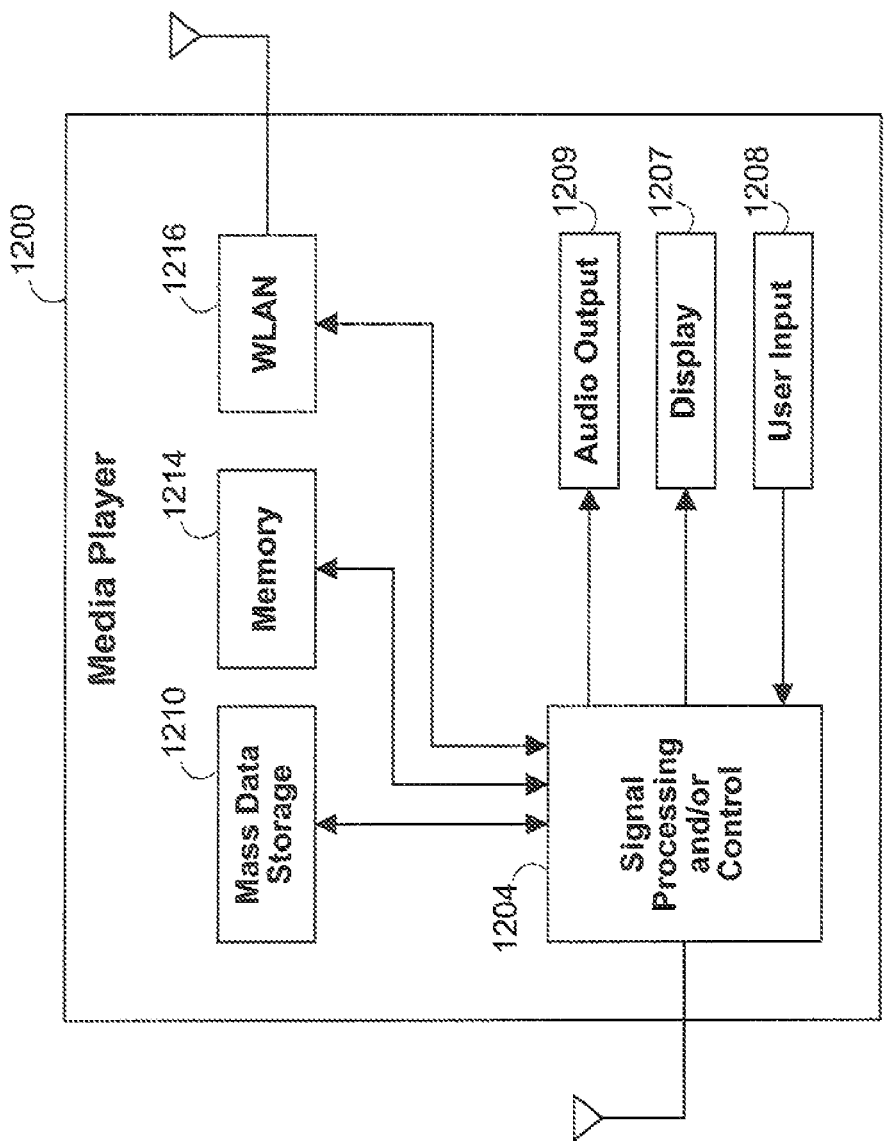
FIG. 11G shows a block diagram of an exemplary media player that can employ the disclosed technology.

Referring now to FIG. 11G, the present invention can be implemented in a media player 1200. The present invention may be implemented as part of the signal processing and/or control circuits, which are generally identified in FIG. 11G at 1204, a WLAN interface 1216 and/or mass data storage 1210 of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. The media player 1200 further includes an audio output 1209 such as a speaker and/or audio output jack. The signal processing and/or control circuits 1204 and/or other circuits (not shown) of the media player 1200 may process data, perform coding and/or encryption, perform calculations, format data and/or perform any other media player function.

The media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage 1210 may include optical and/or magnetic storage devices for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". The media player 1200 may be connected to memory 1214 such as RAM, ROM, low latency memory such as flash memory and/or other suitable electronic data storage. The media player 1200 also may support connections with a WLAN via a WLAN network interface 1216. Still other implementations in addition to those described above are contemplated.

It will be understood that the foregoing is only illustrative of the principles of the invention, and that various modifications can be made by those skilled in the art without departing from the scope and spirit of the invention.

What is claimed is:

1. A motion adaptive video deinterlacer for deinterlacing a plurality of video frames comprising a plurality of video fields, the motion adaptive video deinterlacer comprising:
   motion handling circuitry that provides at least two pixel motion engines for computing motion information for each pixel in the plurality of video fields;
   video motion combiner circuitry that selects one of the pixel motion engines to calculate pixel values based, at least in part, on the motion information; and
   line demultiplexer circuitry to compose frames of deinterlaced video based, at least in part, on the pixel values.

2. The motion adaptive video deinterlacer of claim 1, further comprising temporal and spatial motion tap circuitry comprising memory circuitry to store next frame data, current frame data, and previous frame data.

3. The motion adaptive video deinterlacer of claim 1, wherein the motion handling circuitry further comprises:
   vector interpolator circuitry that comprises a first pixel motion engine to process the plurality of video fields using spatial filtering; and
   motion engine circuitry that comprises a second pixel motion engine to process the plurality of video fields by computing a mean of absolute differences between at least two groups of pixels in the plurality of video fields.

4. The motion adaptive video deinterlacer of claim 3, wherein the motion engine circuitry is selected when the detail surrounding a pixel in a field of the plurality of video fields is less than a threshold value.

5. The motion adaptive video deinterlacer of claim 4, wherein the pixel is a missing pixel in the field of the plurality of video fields.

6. The motion adaptive video deinterlacer of claim 3, wherein the at least two groups of pixels further comprise a group of pixels in a current frame of video being processed by the deinterlacer and a group of pixels in a successive frame of video being processed by the deinterlacer.

7. The motion adaptive video deinterlacer of claim 3, wherein the groups of pixels are of the same size.

8. The motion adaptive video deinterlacer of claim 7, wherein the mean of absolute differences is computed as a mean of a sum of absolute differences between each pixel in a first group of pixels and a corresponding pixel in a second group of pixels.

9. The motion adaptive video deinterlacer of claim 8, wherein the mean of absolute differences are scaled to a four bit pixel value.

10. The motion adaptive video deinterlacer of claim 9, wherein the scaling is based, at least in part, on a low threshold and a high threshold.

11. The motion adaptive video deinterlacer of claim 10, wherein calculated absolute differences below the low threshold are assigned the lowest four bit value and calculated absolute differences higher than the high threshold are assigned the highest four bit value.

12. The motion adaptive video deinterlacer of claim 1, wherein the at least two pixel motion engines process the plurality of video fields in parallel.

13. The motion adaptive video deinterlacer of claim 1, wherein the video motion combiner circuitry selects the pixel motion engine based, at least in part, on the detail around a particular pixel.

14. The motion adaptive video deinterlacer of claim 13, wherein the detail is computed based, at least in part, on the variation in pixel values around a particular pixel.

15. The motion adaptive video deinterlacer of claim 1, further comprising recursive motion circuitry that uses the at least two pixel motion engines to provide temporal motion expansion of the plurality of video fields.

16. The motion adaptive video deinterlacer of claim 15, wherein the recursive motion circuitry further comprises:
   circuitry that receives the motion information from at least one of the at least two pixel motion engines;
   recursion delay circuitry that computes at least one delayed version of the motion information; and
   weighted factor calculation circuitry that uses a weighted factor to calculate pixel values from the motion information and the at least one delayed version of the motion information.

17. The motion adaptive video deinterlacer of claim 16, wherein the at least one delayed version of the motion information comprises a one time period delayed version of the motion information and a two time period delayed version of the motion information.

18. The motion adaptive video deinterlacer of claim 17, wherein the two time period delayed version of the motion information is spatially aligned to a pixel in a field of the plurality of video fields that is currently being processed by the deinterlacer.

19. The motion adaptive video deinterlacer of claim 18, wherein the weighting factor is used to calculate pixel values based on asymmetric recursion.

20. A method for deinterlacing a plurality of video frames comprising a plurality of video fields, the method comprising:
   computing motion information for each pixel in the plurality of video fields using at least two pixel motion engines;
   selecting motion information from one of the pixel motion engines based, at least in part, on the computed motion information;
   calculating pixel values based, at least in part, on the selected motion information; and
   composing frames of deinterlaced video based, at least in part, on the pixel values.

21. The method of claim 20, further comprising:
   processing the plurality of video fields using spatial filtering; and
   computing a mean of absolute differences between at least two groups of pixels in the plurality of the video fields.

22. The method of claim 21, further comprising computing temporal motion expansion of the plurality of video fields.

23. The method of claim of claim 22, further comprising:
   computing at least one delayed version of the motion information; and
   calculating pixel values by applying a weighted factor based, at least in part, on asymmetric recursion to the motion information and the at least one delayed version of the motion information.

24. A motion adaptive video deinterlacer for deinterlacing a plurality of video frames comprising a plurality of video fields, the motion adaptive video deinterlacer comprising:

means for computing motion information for each pixel in the plurality of video fields using at least two pixel motion engines;

means for selecting motion information from one of the pixel motion engines based, at least in part, on the computed motion information;

means for calculating pixel values based, at least in part, on the selected motion information; and means for composing frames of deinterlaced video based, at least in part, on the pixel values.

25. The motion adaptive video deinterlacer of claim 24, further comprising:

means for computing at least one delayed version of the motion information; and means for computing a mean of absolute differences between at least two groups of pixels in the plurality of the video fields.

26. A motion adaptive video deinterlacer for deinterlacing a plurality of video frames comprising a plurality of video fields, each field comprising a plurality of horizontal video lines, the motion adaptive video deinterlacer comprising:

motion handling circuitry to divide each frame into a plurality of regions, wherein each region includes a contiguous set of horizontal video lines across the plurality of video fields within the each frame;

cadence detection circuitry to detect a cadence in each of the plurality of regions; and line demultiplexer circuitry to compose frames of deinterlaced video based, at least in part, on the detected cadence.

27. The motion adaptive video deinterlacer of claim 26, wherein the cadence detection circuitry detects one or more of the following cadences: 3-2, 2-2, 2-2-2-4, 2-3-3-2, 3-2-3-2-2, 5-5, 6-4, and 8-7.

28. The motion adaptive video deinterlacer of claim 26, wherein the cadence detection circuitry detects a programmable cadence.

29. The motion adaptive video deinterlacer of claim 26, wherein the plurality of regions comprises one or more of: a full frame, a top portion of a frame, a bottom portion of a frame, a right portion of a frame, and a left portion of a frame.

30. The motion adaptive video deinterlacer of claim 29, wherein the top portion of a frame is defined as a full frame excluding a number of horizontal video lines at the bottom of the frame.

31. The motion adaptive video deinterlacer of claim 30, wherein the number of horizontal video lines excluded is selected by the cadence handling circuitry.

32. The motion adaptive video deinterlacer of claim 26, wherein the cadence handling circuitry further comprises a plurality of film cadence handler state machine circuitry to detect a particular cadence in each of the plurality of regions.

33. The motion adaptive video deinterlacer of claim 32, wherein one of the plurality of film cadence handler state machine circuitry further comprises:

flag shifting circuitry that receives a plurality of global motion flags;

enter match circuitry that receives pattern inputs to detect a first pattern match; and sustain match circuitry that detects a plurality of subsequent pattern matches after said first pattern match.

34. The motion adaptive video deinterlacer of claim 33, wherein the flag shifting circuitry shifts the plurality of global motion flags by a period of time equal to a total number of fields in the particular cadence.

35. The motion adaptive video deinterlacer of claim 33, wherein the pattern inputs comprise a next field pattern, a previous field pattern, and a frame pattern.

36. The motion adaptive video deinterlacer of claim 35, wherein the next field pattern is selected based on comparing a global motion of each field in the particular cadence to a global motion in a next temporal field.

37. The motion adaptive video deinterlacer of claim 35, wherein the previous field pattern is selected based on comparing the global motion of each field in the particular cadence to a global motion of a previous temporal field.

38. The motion adaptive video deinterlacer of claim 35, wherein the frame pattern is computed as a bitwise logical OR operation between the next field pattern and the previous field pattern.

39. The motion adaptive video deinterlacer of claim 35, wherein a pattern match is computed as a match between the frame pattern and the global motion flags.

40. A method for deinterlacing a plurality of video frames comprising a plurality of video fields, each field comprising a plurality of horizontal video lines, the method comprising:

dividing each frame into a plurality of regions, wherein each region includes a contiguous set of horizontal video lines across the plurality of video fields within the each frame;

detecting a cadence in each of the plurality of regions; and composing frames of deinterlaced video based, at least in part, on the detected cadence.

41. The method of claim 40, wherein the plurality of regions comprises one or more of: a full frame, a top portion of a frame, a bottom portion of a frame, a right portion of a frame, and a left portion of a frame.

42. The method of claim 40, further comprising:

receiving an indication of a particular cadence;

receiving a plurality of global motion flags;

receiving pattern inputs;

detecting a plurality of pattern matches based, at least in part, on the particular cadence, pattern inputs, and global motion flags.

43. The method of claim 42, wherein the plurality of global motion flags are shifted by a period of time equal to a total number of fields in the particular cadence.

44. The method of claim 42, wherein the pattern inputs comprise a next field pattern, a previous field pattern, and a frame pattern, the method further comprising selecting the next field pattern by comparing a global motion of each field in the particular cadence to a global motion in a next temporal field.

45. The method of claim 42, wherein the pattern inputs comprise a next field pattern, a previous field pattern, and a frame pattern, the method further comprising selecting the previous field pattern by comparing a global motion of each field in the particular cadence to a global motion of a previous temporal field.

46. The method of claim 42, wherein the pattern inputs comprise a next field pattern, a previous field pattern, and a frame pattern, the method further comprising computing the frame pattern as a bitwise logical OR operation between the next field pattern and the previous field pattern.

47. A motion adaptive video deinterlacer for deinterlacing a plurality of video frames comprising a plurality of video fields, each field comprising a plurality of horizontal video lines, the motion adaptive video deinterlacer comprising:

means for dividing each frame into a plurality of regions, wherein each region includes a contiguous set of horizontal video lines across the plurality of video fields within the each frame;

means for detecting the cadence in each of the plurality of regions; and means for composing frames of deinterlaced video based, at least in part, on the detected cadence.

48. The motion adaptive video deinterlacer of claim 47, further comprising:
means for receiving an indication of a particular cadence;
means for receiving a plurality of global motion flags;
means for receiving pattern inputs;
means for detecting a plurality of pattern matches based, at least in part, on the particular cadence, pattern inputs, and global motion flags.

49. The motion adaptive video deinterlacer of claim 48, further comprising:
means for calculating a next frame pattern input;
means for calculating a previous frame pattern input; and
means for calculating a frame pattern input.

50. The motion adaptive video deinterlacer of claim 49, further comprising means for computing a pattern match between the frame pattern and the global motion flags.

51. A motion adaptive video deinterlacer for deinterlacing a plurality of video frames comprising a plurality of video fields, the motion adaptive video deinterlacer comprising:
motion handling circuitry that provides at least two pixel motion engines for computing motion information for each pixel in the plurality of video fields; and
vector interpolator circuitry that processes boundary exclusion windows to exclude regions of the frame that contain bad pixels, wherein bad pixels comprise missing and garbage pixels;
cadence detection circuitry that determines when to enter and exit 3-2 film mode; and
line demultiplexer circuitry to compose frames of deinterlaced video based, at least in part, on the deinterlacer entering and exiting 3-2 film mode.

52. The motion adaptive video deinterlacer of claim 51, wherein the cadence detection circuitry further comprises automatic noise calibration circuitry that provides a noise threshold.

53. The motion adaptive video deinterlacer of claim 52, wherein the noise threshold is used by the cadence detection circuitry to determine when to enter and exit 3-2 film mode.

54. The motion adaptive video deinterlacer of claim 52, wherein the automatic noise calibration circuitry further comprises:
per pixel absolute difference calculation circuitry that calculates a sum of absolute differences between at least two groups of pixels in the plurality of video fields;
accumulator circuitry that stores a plurality of sum of absolute differences;
minimum selection circuitry that selects a minimum sum of absolute differences from the stored plurality of sum of absolute differences; and
threshold detection circuitry that calculates a noise threshold based, at least in part, on the selected minimum sum of absolute differences.

55. The motion adaptive video deinterlacer of claim 54, wherein the plurality of sum of absolute differences includes five sum of absolute differences.

56. The motion adaptive video deinterlacer of claim 54, wherein the at least two groups of pixels further comprise a group of pixels in a frame after a current frame and a group of pixels in a frame previous to the current frame.

57. The motion adaptive video deinterlacer of claim 54, wherein the accumulator circuitry further comprises storage circuitry that stores a plurality of sum of absolute difference values calculated for an equal plurality of consecutive fields processed by the deinterlacer.

58. The motion adaptive video deinterlacer of claim 57, wherein the plurality of sum of absolute differences values comprises at least five sum of absolute differences values.

59. The motion adaptive video deinterlacer of claim 54, wherein the threshold detection circuitry calculates the noise threshold based, at least in part, on comparing the selected minimum sum of absolute differences to a plurality of thresholds.

60. The motion adaptive video deinterlacer of claim 59, wherein the plurality of thresholds are selected by the deinterlacer.

61. The motion adaptive video deinterlacer of claim 54, wherein the automatic noise calibration circuitry further comprises circuitry to calculate the position of the minimum sum of absolute differences value in the sequence of video fields whose sum of absolute differences are stored in the accumulator circuitry.

62. The motion adaptive video deinterlacer of claim 61, wherein the automatic noise calibration circuitry further comprises 3-2 frame cadence handler state machine circuitry that receives said calculated position.

63. The motion adaptive video deinterlacer of claim 62, wherein the 3-2 frame cadence handler state machine circuitry exits 3-2 film mode based, at least in part, on the calculated position not being a continuous shifting position across five consecutive fields.

64. The motion adaptive video deinterlacer of claim 63, wherein the continuous shifting position is defined as a position incremented by one every state machine transition period.

65. The motion adaptive video deinterlacer of claim 64, wherein the state machine transition period is defined as the processing time that the 3-2 frame cadence handler state machine circuitry takes to transition between states.

66. The motion adaptive video deinterlacer of claim 62, wherein the 3-2 frame cadence handler state machine circuitry enters 3-2 film mode based, at least in part, on the calculated position being a continuous shifting position across five consecutive fields.

67. A method for deinterlacing a plurality of video frames comprising a plurality of video fields, the method comprising:
computing motion information for each pixel in the plurality of video fields using at least two pixel motion engines;
processing boundary exclusion windows to exclude regions of a frame that contain bad pixels, wherein bad pixels comprise missing and garbage pixels;
determining when to enter and exit 3-2 film mode; and
composing frames of deinterlaced video based, at least in part, on the deinterlacer entering and exiting 3-2 film mode.

68. The method of claim 67, further comprising:
computing a noise threshold;
determining when to enter and exit 3-2 film mode based, at least in part, on the noise threshold.

69. The method of claim 68, further comprising calculating a position of a minimum sum of absolute differences value in the sequence of video fields.

70. The method of claim 69, further comprising exiting 3-2 film mode based, at least in part, on the calculated position not being a continuous shifting position across five consecutive fields, wherein the continuous shifting position is defined as a position incremented by one every state machine transition period.

71. The method of claim 69, further comprising entering 3-2 film mode based, at least in part, on the calculated position being a continuous shifting position across five consecutive fields, wherein the continuous shifting position is defined as a position incremented by one every state machine transition period.

72. A motion adaptive video deinterlacer for deinterlacing a plurality of video frames comprising a plurality of video fields, the motion adaptive video deinterlacer comprising:

means for computing motion information for each pixel in the plurality of video fields using at least two pixel motion engines;

means for processing boundary exclusion windows to exclude regions of the frame that contain bad pixels, wherein bad pixels comprise missing and garbage pixels;

means for computing a noise threshold;

means for determining when to enter and exit 3-2 film mode based, at least in part, on the noise threshold; and means for composing frames of deinterlaced video based, at least in part, on the deinterlacer entering and exiting 3-2 film mode.

73. The motion adaptive video deinterlacer of claim 72 further comprising means for calculating a position of a minimum sum of absolute differences value in the sequence of video fields.

74. The motion adaptive video deinterlacer of claim 73, further comprising means for exiting 3-2 film mode based, at least in part, on the calculated position not being a continuous shifting position across five consecutive fields, wherein the continuous shifting position is defined as a position incremented by one every state machine transition period.

75. The motion adaptive video deinterlacer of claim 73, further comprising means for entering 3-2 film mode based, at least in part, on the calculated position being a continuous shifting position across five consecutive fields, wherein the continuous shifting position is defined as a position incremented by one every state machine transition period.

* * * * *